US009822580B2

(12) United States Patent
Cooper et al.

(10) Patent No.: US 9,822,580 B2
(45) Date of Patent: Nov. 21, 2017

(54) LOCALIZED HEATING TECHNIQUES INCORPORATING TUNABLE INFRARED ELEMENT(S) FOR VACUUM INSULATING GLASS UNITS, AND/OR APPARATUSES FOR SAME

(75) Inventors: David J. Cooper, Canton, MI (US); Ryan L. Dear, Huntertown, IN (US); Robert A. Miller, Sylvania, OH (US)

(73) Assignee: Guardian Glass, LLC, Auburn Hills, MI (US)

( * ) Notice: Subject to any disclaimer, the term of this patent is extended or adjusted under 35 U.S.C. 154(b) by 835 days.

(21) Appl. No.: 12/929,876

(22) Filed: Feb. 22, 2011

(65) Prior Publication Data

US 2012/0210750 A1    Aug. 23, 2012

(51) Int. Cl.
| | | |
|---|---|---|
| C03C 27/00 | (2006.01) | |
| E06B 3/663 | (2006.01) | |
| C03C 27/06 | (2006.01) | |
| E06B 3/673 | (2006.01) | |

(52) U.S. Cl.
CPC .......... *E06B 3/66357* (2013.01); *C03C 27/06* (2013.01); *E06B 3/67334* (2013.01)

(58) Field of Classification Search
CPC .. C03C 27/06; E06B 3/67334; E06B 3/66357
USPC ....... 65/42, 43, 36, 33.2, 33.6; 156/109, 498
See application file for complete search history.

(56) References Cited

U.S. PATENT DOCUMENTS

| 3,445,256 A | 5/1969 | Dalton |
| 3,454,408 A | 7/1969 | Busdiecker |
| 3,650,778 A | 3/1972 | Dumesnil et al. |
| 3,837,866 A | 9/1974 | Malmendier et al. |
| 4,256,495 A | 3/1981 | Kawamura et al. |
| 4,406,944 A * | 9/1983 | Crain et al. ................... 219/388 |

(Continued)

FOREIGN PATENT DOCUMENTS

| AU | 60 657 | 1/1967 |
| DE | 195 45 422 | 6/1997 |

(Continued)

OTHER PUBLICATIONS

"Laser Sintering of Thick-Film Conductors for Microelectronic Applications", Kinzel et al.

(Continued)

*Primary Examiner* — Queenie Dehghan
(74) *Attorney, Agent, or Firm* — Nixon & Vanderhye P.C.

(57) ABSTRACT

Certain example embodiments of this invention relate to edge sealing techniques for vacuum insulating glass (VIG) units. More particularly, certain example embodiments relate to techniques for providing localized heating to edge seals of units, and/or unitized ovens for accomplishing the same. In certain example embodiments, infrared (IR) heating elements are controllable to emit IR radiation at a peak wavelength in the near infrared (NIR) and/or short wave infrared (SWIR) band(s), and the peak wavelength may be varied by adjusting the voltage applied to the IR heating elements. The peak wavelength may be selected so as to preferentially heat the frit material used to form a VIG edge seal while reducing the amount of heat provided to substrates of the VIG unit. In certain example embodiments, the substrates of the VIG unit do not reach a temperature of 325 degrees C. for more than 1 minute.

15 Claims, 19 Drawing Sheets

(56) References Cited

U.S. PATENT DOCUMENTS

| | | |
|---|---|---|
| 4,683,154 A | 7/1987 | Benson et al. |
| 4,743,302 A | 5/1988 | Dumesnil et al. |
| 4,801,488 A | 1/1989 | Smith |
| 4,820,365 A | 4/1989 | Brumm et al. |
| 5,013,360 A | 5/1991 | Finkelstein et al. |
| 5,051,381 A | 9/1991 | Ohji et al. |
| 5,188,990 A | 2/1993 | Dumesnil et al. |
| 5,336,644 A | 8/1994 | Akhtar et al. |
| 5,534,469 A | 7/1996 | Hayashi |
| 5,657,607 A | 8/1997 | Collins et al. |
| 5,664,395 A | 9/1997 | Collins et al. |
| 5,902,652 A | 5/1999 | Collins et al. |
| 6,365,242 B1 | 4/2002 | Veerasamy |
| 6,383,580 B1 | 5/2002 | Aggas |
| 6,399,169 B1 | 6/2002 | Wang et al. |
| 6,444,281 B1 | 9/2002 | Wang et al. |
| 6,503,583 B2 | 1/2003 | Nalepka et al. |
| 6,541,083 B1 | 4/2003 | Landa et al. |
| 6,635,321 B2 | 10/2003 | Wang et al. |
| 6,641,689 B1 | 11/2003 | Aggas |
| 6,692,600 B2 | 2/2004 | Veerasamy et al. |
| 6,701,749 B2 * | 3/2004 | Wang et al. ............ 65/41 |
| 6,927,782 B2 | 8/2005 | Coldefy et al. |
| 6,946,171 B1 | 9/2005 | Aggas |
| 7,244,480 B2 | 7/2007 | Minaai et al. |
| 7,425,518 B2 | 9/2008 | Yoshida et al. |
| 7,435,695 B2 | 10/2008 | Hormadaly |
| 7,452,489 B2 | 11/2008 | Sawai et al. |
| 7,602,121 B2 | 10/2009 | Aitken et al. |
| 7,832,234 B2 * | 11/2010 | Hoppe et al. ............ 65/33.2 |
| 2003/0020027 A1 * | 1/2003 | Danvers ............ 250/504 R |
| 2003/0182966 A1 * | 10/2003 | Fotheringham et al. ...... 65/33.2 |
| 2005/0013980 A1 * | 1/2005 | Toas et al. ............ 428/292.1 |
| 2005/0233885 A1 | 10/2005 | Yoshida et al. |
| 2006/0042748 A1 | 3/2006 | Hasegawa et al. |
| 2006/0128549 A1 | 6/2006 | Hormadaly |
| 2009/0151853 A1 * | 6/2009 | Cooper ............ 156/104 |
| 2009/0151855 A1 | 6/2009 | Wang et al. |
| 2009/0297862 A1 | 12/2009 | Boek et al. |
| 2010/0275654 A1 | 11/2010 | Wang |

FOREIGN PATENT DOCUMENTS

| | | |
|---|---|---|
| EP | 0 013 650 | 7/1980 |
| EP | 0 061 183 | 9/1982 |
| EP | 0 889 010 | 1/1999 |
| EP | 1 216 971 | 6/2002 |
| EP | 1 281 329 | 3/2003 |
| EP | 1 571 134 | 9/2005 |
| EP | 2 017 236 | 1/2009 |
| JP | 63-55098 | 4/1988 |
| JP | 2002-137939 | 5/2002 |
| JP | 2006-524419 | 10/2006 |
| KR | 10-2010-0004572 | 1/2010 |
| KR | 10-2010-0103568 | 9/2010 |
| KR | 2011-0004340 | 1/2011 |
| SU | 852811 | 8/1981 |
| SU | 1 578 093 | 7/1990 |
| SU | 1590472 | 9/1990 |
| SU | 1694561 | 11/1991 |
| SU | 1791433 | 1/1993 |
| WO | WO 96/02473 | 2/1996 |
| WO | WO 96/22255 | 7/1996 |
| WO | WO 02/14640 | 2/2002 |
| WO | WO 02/27135 | 4/2002 |
| WO | WO 2004/095597 | 11/2004 |
| WO | WO 2006/044383 | 4/2006 |
| WO | WO 2012/035565 | 3/2012 |
| WO | WO 2012/073662 | 6/2012 |

OTHER PUBLICATIONS

"Pb-Free Vanadium-Based Low-Melting Glass Paste: VS-1026"; Hitachi Powered Metals Technical Report No. 7, (2008).
U.S. Appl. No. 12/000,663, filed Dec. 14, 2007; Cooper.
U.S. Appl. No. 12/000,791, filed Dec. 17, 2007, Wang et al.
U.S. Appl. No. 12/453,221, filed May 1, 2009; Wang.
U.S. Appl. No. 12/458,071, filed Jun. 30, 2009; Cooper et al.
International Search Report dated Apr. 9, 2009.
International Search Report dated Jul. 8, 2010.
International Search Report dated Mar. 18, 2009.
International Search Report dated Oct. 2, 2012.
U.S. Appl. No. 12/929,875, filed Feb. 22, 2011; Dennis.
U.S. Appl. No. 12/929,874, filed Feb. 22, 2011; Dennis.
International Search Report dated May 29, 2012.

* cited by examiner

LOCALIZED HEATING TECHNIQUES INCORPORATING TUNABLE INFRARED ELEMENT(S) FOR VACUUM INSULATING GLASS UNITS, AND/OR APPARATUSES FOR SAME

FIELD OF THE INVENTION

Certain example embodiments of this invention relate to edge sealing techniques for vacuum insulating glass (VIG) units. More particularly, certain example embodiments relate to techniques for providing localized heating to edge seals of units, and/or unitized ovens for accomplishing the same. In certain example embodiments, a plurality of infrared (IR) heating elements are controllable to emit IR radiation at a peak wavelength in the near infrared (NIR) and/or short wave infrared (SWIR) band(s), and the peak wavelength may be varied by adjusting the voltage applied to the IR heating elements. The peak wavelength may be selected so as to preferentially heat the frit material used to form a VIG edge seal while reducing the amount of heat provided to substrates of the VIG unit.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 therebetween. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution therebetween. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventor Collins of the '395 patent states in "Thermal Outgassing of Vacuum Glazing," by Lenzen, Turner and Collins, that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

Unfortunately, the aforesaid high temperatures and long heating times of the entire assembly utilized in the formulation of edge seal 4 are undesirable, especially when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength is of course undesirable.

In FIGS. 3-4, it is noted that much better temper strength remains in a thermally tempered sheet when it is heated to a temperature of 800° F. (about 428° C.) for one hour as opposed to 900° F. for one hour. Such a glass sheet retains about 70% of its original temper strength after one hour at 800° F., which is significantly better than the less than 20% when at 900° F. for the same period of time.

Another advantage associated with not heating up the entire unit for too long is that lower temperature pillar materials may then be used. This may or may not be desirable in some instances.

Even when non-tempered glass substrates are used, the high temperatures applied to the entire VIG assembly may melt the glass or introduce stresses. These stresses may increase the likelihood of deformation of the glass and/or breakage.

Thus, it will be appreciated that there is a need in the art for a vacuum IG unit, and corresponding method of making the same, where a structurally sound hermetic edge seal may be provided between opposing glass sheets. There also exists a need in the art for a vacuum IG unit including tempered glass sheets, wherein the peripheral seal is formed such that the glass sheets retain more of their original temper strength than with a conventional vacuum IG manufacturing technique where the entire unit is heated in order to form a solder glass edge seal.

An aspect of certain example embodiments of this invention relates to applying localized heating to the periphery of a unit to form edge seals to reduce the heating of the non-peripheral areas of the unit and thereby reduce the chances of the substrates breaking.

An aspect of certain example embodiments relates to providing staged heating, localized heating, and staged cooling of a unit via a unitized oven, the localized heating being provided by a substantially linear focused infrared (IR) heat source comprising an array or matrix of linear heat sources.

Another aspect of certain example embodiments relates to providing a vacuum IG unit having a peripheral or edge seal formed so that at least certain portion(s) of thermally tempered glass substrates/sheets of the vacuum IG unit retain more of their original temper strength than if conventional edge seal forming techniques were used with the solder glass edge seal material.

Another aspect of certain example embodiments relates to providing a vacuum IG unit, and method of making the same, wherein at least a portion of the resulting thermally tempered glass substrate(s) retain(s) at least about 50% of original temper strength after formation of the edge seal (e.g., solder glass edge seal).

Another aspect of certain example embodiments relates to reducing the amount of post-tempering heating time necessary to form a peripheral/edge seal in a vacuum IG unit.

In certain example embodiments of this invention, an apparatus for forming an edge seal in a vacuum insulated glass (VIG) unit is provided. A plurality of infrared (IR) heating elements are controllable to emit IR radiation at a peak wavelength in the near infrared (NIR) and/or short wave infrared (SWIR) band(s). The IR heating elements are spaced apart from one another so as to have a 2-6" center-to-center distance. The IR heating elements are vertically positioned 1-36" (more preferably 2-10") above an upper surface and/or below a lower surface of a VIG subassembly insertable therein. A controller is operable to adjust an amount of voltage supplied to the plurality of IR heating elements to vary the peak wavelength produced by the plurality of IR heating elements. Inner walls of the apparatus comprise a material having characteristics suitable for causing a reduced amount of IR radiation from the IR heating elements impinging thereon to be reflected, with the reflected IR radiation being reflected in a generally diffuse or undirected pattern. Insulation is provided around the inner walls.

In certain example embodiments of this invention, a method of making a vacuum insulated glass (VIG) unit comprising an edge seal is provided. A VIG subassembly is inserted into an apparatus including a plurality of infrared (IR) heating elements controllable to emit IR radiation at a peak wavelength in the near infrared (NIR) and/or short wave infrared (SWIR) band(s), with the plurality of IR heating elements being spaced apart from one another so as to have a 2-6" center-to-center distance and being vertically positioned 2-10" above an upper surface and/or below a lower surface of the VIG subassembly. Inner walls of the apparatus comprise a material having characteristics suitable for causing a reduced amount of IR radiation from the IR heating elements impinging thereon to be reflected, with the reflect IR radiation being reflected in a diffuse or undirected pattern. Insulation is provided around the inner walls. Frit material provided around the periphery of the VIG subassembly is heated via the plurality of IR heating elements in forming the edge seal, with the amount of voltage being supplied to the plurality of IR heating elements being adjustable to vary the peak wavelength produced by the plurality of IR heating elements so as to preferentially heat the frit material compared to glass substrates of the VIG subassembly.

In certain example embodiments of this invention, an apparatus for forming an edge seal in a vacuum insulated glass (VIG) unit is provided. A plurality of infrared (IR) heating elements are controllable to emit IR radiation at a peak wavelength in the near infrared (NIR) and/or short wave infrared (SWIR) band(s). A controller is operable to adjust an amount of voltage supplied to the plurality of IR heating elements to vary the peak wavelength produced by the plurality of IR heating elements. The controller is operable in first and second modes, with the first mode being a preheat mode at which the IR heating elements operate at approximately half power density and 25-75% (more preferably 45-55%) voltage and with the second mode being a frit sealing mode at which the IR heating elements operate at a half power density and at 50-100% (more preferably 75-85%) voltage.

In certain example embodiments of this invention, a method of making a VIG unit is provided. A VIG subassembly is provided to a heater, with the VIG subassembly comprising first and second substantially parallel spaced apart glass substrates, a plurality of support pillars between the first and second glass substrates, and a frit material for forming an edge seal therebetween. Infrared (IR) energy is emitted from at least one bulb operating at approximately half power density so as to preheat the VIG subassembly. IR energy is emitted from the at least one bulb operating at approximately half power density and at a pre-selected peak IR wavelength at which the first and second glass substrates have an absorption of less than 30% and at which the frit material has an absorption of greater than 50% (more preferably greater than 70% or 80%) in making the VIG unit.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 2:
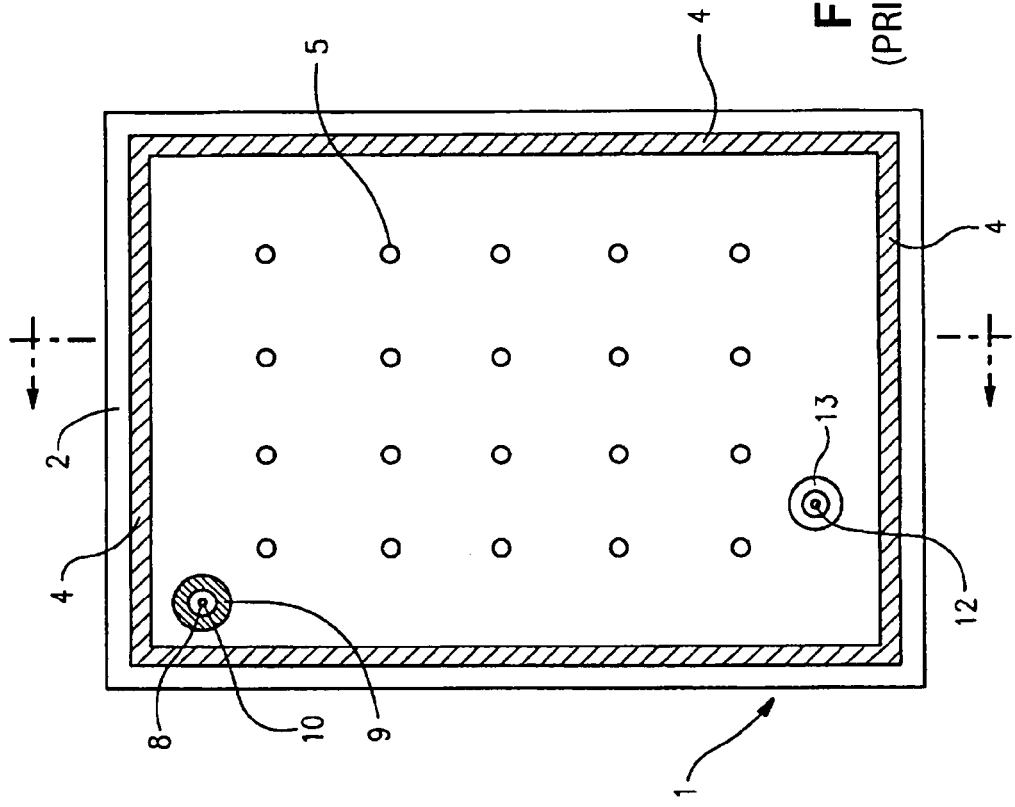
FIG. 2 is a prior art top plan view of the bottom substrate, edge seal, and spacers of the FIG. 1 vacuum IG unit taken along the section line illustrated in FIG. 1.
Figure 1:
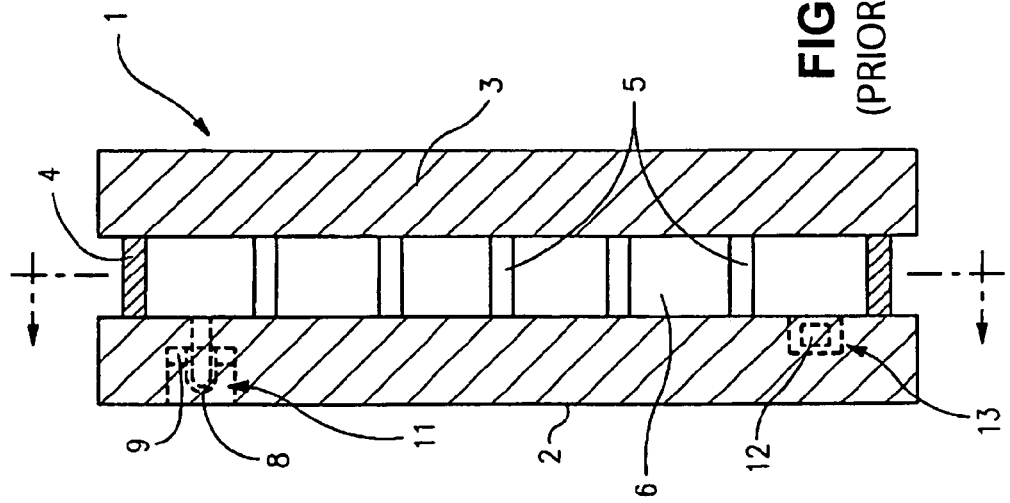
FIG. 1 is a prior art cross-sectional view of a conventional vacuum IG unit.
Figure 3:
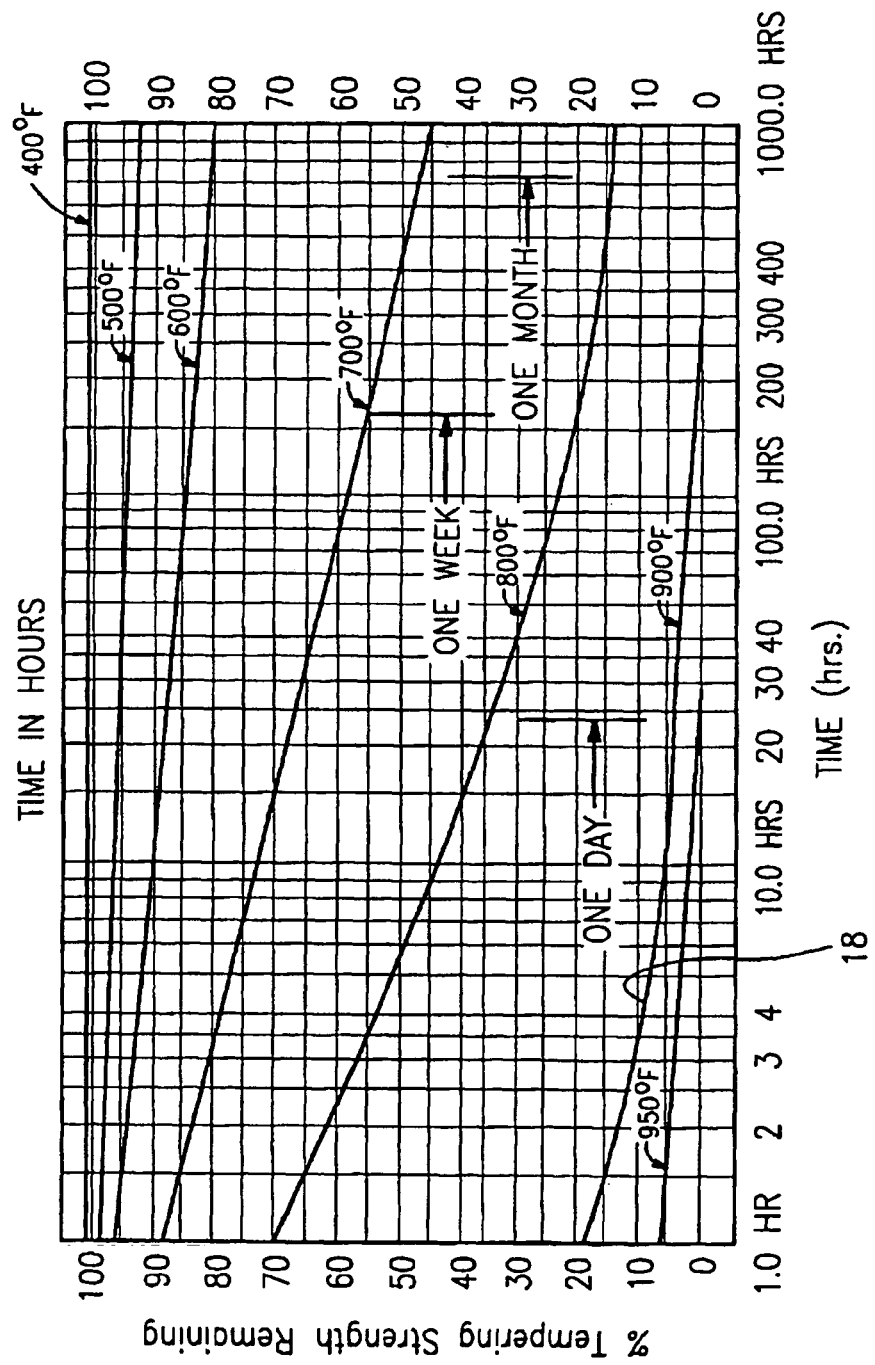
FIG. 3 is a graph correlating time (hours) versus percent tempering strength remaining, illustrating the loss of original temper strength for a thermally tempered sheet of glass after exposure to different temperatures for different periods of time.
Figure 4:
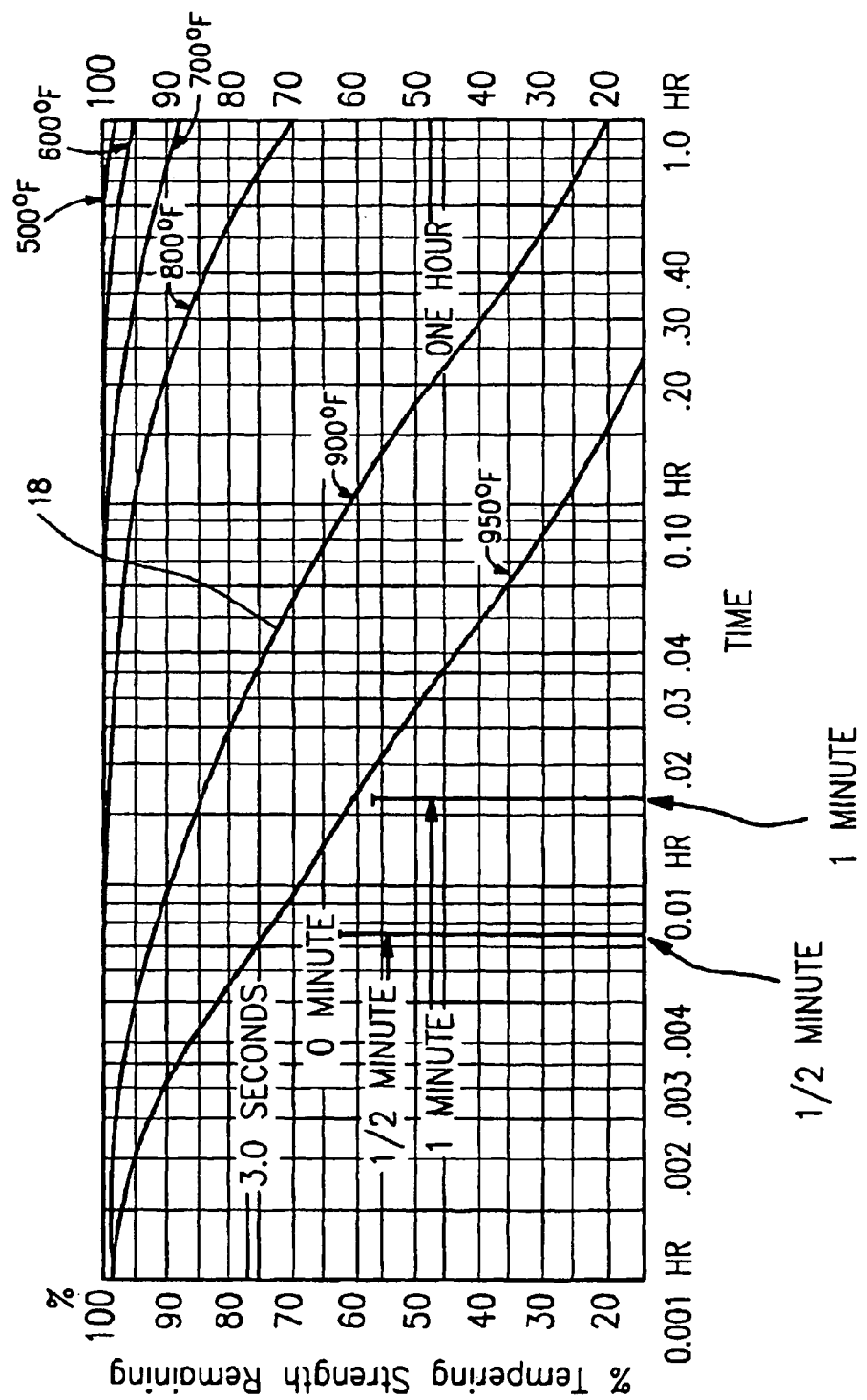
FIG. 4 is a graph correlating time versus percent tempering strength remaining similar to that of FIG. 3, except that a smaller time period is provided on the x-axis.

Certain embodiments of this invention relate to an improved peripheral or edge seal in a vacuum IG window unit, and/or a method of making the same. "Peripheral" and "edge" seals herein do not mean that the seals are located at the absolute periphery or edge of the unit, but instead mean that the seal is at least partially located at or near (e.g., within about two inches) an edge of at least one substrate of the unit. Likewise, "edge" as used herein is not limited to the absolute edge of a glass substrate but also may include an area at or near (e.g., within about two inches) of an absolute edge of the substrate(s). Also, it will be appreciated that as used herein the term "VIG assembly" refers to an intermediate product prior to the VIG's edges being sealed and evacuation of the recess including, for example, two parallel-spaced apart substrates and a frit. Also, while the frit may be said to be "on" or "supported" by one or more of the substrates herein, this does not mean that the frit must directly contact the substrate(s). In other words, the word "on" covers both directly and indirectly on, so that the frit may be considered "on" a substrate even if other material (e.g., a coating and/or thin film) is provided between the substrate and the frit.

In certain example embodiments of this invention, a method of preferential heating for frit edge seal of vacuum insulated glass units using a unitized zoned oven is provided. The pre-assembled unit is first heated to an intermediate temperature lower than that required to melt the frit seal (e.g., a temperature of about 200-300° C.). Then, the edge of the unit is further heated with localized heat from a substantially linear focused infrared (IR) heat source and/or via at least one substantially two-dimensional array of heat sources that is configured to generate IR radiation at a near infrared wavelength (e.g., a wavelength of about 0.7-5.0 µm) and, more preferably, of about 1.1-1.4 µm, in order to provide a localized temperature of from about 350-500° C. until the frit is melted. At the same time, if tempered or heat strengthened glass is used, at least certain portions of a thermally tempered glass sheet(s)/substrate(s) of the VIG unit lose no more than about 50% of original temper strength, as the majority of the area is still under the intermediate temperature. Because of the overall lower temperature, the techniques of certain example embodiments advantageously consume less energy and save time when the samples cool down. It will be appreciated that the localized temperature may be determined based in part on the material(s) comprising the frit. For example, lead-inclusive frits tend to require lower temperatures than silver-inclusive fits.

The unitized oven of certain example embodiments includes multiple chambers. Generally, the chambers will correspond to an entrance zone, an edge sealing zone, and an exit zone. It will be appreciated that an illustrative unitized oven may include multiple chambers for accomplishing the functionality of a single zone (e.g., two entrance chambers may be provided for performing entrance zone functionality, two exit chambers may be providing for performing exit zone functionality, etc.), and/or that a single chamber may be provided to accomplish the functionality associated with multiple zones (for example, a single chamber may provide entrance and exit zone functionality, etc.).

Figure 5:
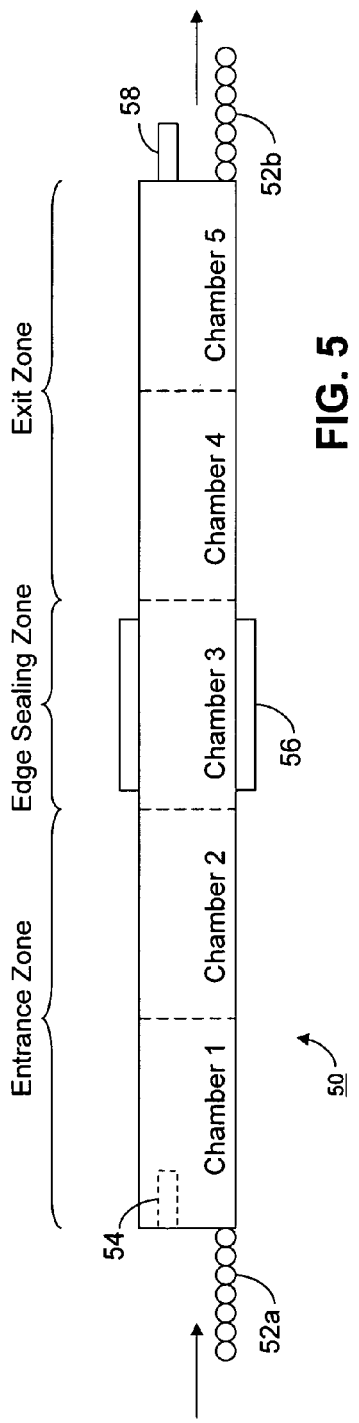
FIG. 5 is a simplified side view illustrating an example layout of a five chamber oven in accordance with an example embodiment.

By way of example and without limitation, FIG. 5 is a simplified side view illustrating an example layout of a five chamber oven 50 in accordance with an example embodiment. However, as alluded to above, it will be appreciated that more or fewer chambers may be employed. In certain non-limiting implementations, adjacent chambers may be separated by sealing doors (represented by dashed lines in between adjacent chambers) located between them. Linkage, pulleys, and/or other means may be provided to open and close such doors.

The unitized oven 50 of certain example embodiments is semi-continuous in terms of product flow. A roller conveyer 52 or other transport technique may be used to physically move a given VIG assembly from one zone and/or chamber to the next so that the VIG assembly and/or its contents are not disturbed or repositioned relative to one another. At a start point 52a, the roller conveyer 52 feeds VIG assemblies into the oven 50, e.g., through a first door 54. VIG assemblies may be moved into place and stopped when they reach a proper position within a chamber and/or zone. The position of the VIG assembly may be determined, for example, by photo-eye or other detection means. By way of example and without limitation, the position may be the center of a particular chamber, aligned within particular horizontal and vertical positions (e.g., as described in greater detail below in relation to FIG. 6), etc. In certain example embodiments, it may be advantageous to temporarily stop a VIG assembly at a particular location, for example, to allow the VIG assembly to heat sufficiently, to allow a solder frit to melt, etc.

In certain example embodiments, multiple VIG assemblies may be fed into the oven 50 at the same time so that they are processed in batch. For example, in a five-chamber oven like the one shown in FIG. 5, up to five VIG assemblies may be processed by the oven at a time, with the process being started and stopped in dependence on the progress of each chamber. For example, the edge sealing zone may require more time than the cooling performed in the exit zone chambers. Thus, there may be some delay built into the process to account for the different process times of the different zones and/or chambers.

The entrance zone (e.g., chambers 1 and 2 in the FIG. 5 example embodiment) is equipped with substantially uniform heat sources so that the VIG assembly is heatable in stages. That is, substantially uniform heat may be applied to the VIG assembly so as to substantially uniformly heat the entire VIG assembly. Heating may be accomplished via IR radiation from an IR heat source or other means so as to reduce disturbance of the VIG assembly or its contents.

In an edge sealing zone (e.g., chamber 3 of FIG. 5), substantially uniform heating sources are installed to maintain the VIG assembly as a whole at a predetermined background temperature. This may be accomplished by maintaining the entire VIG assembly at the intermediate temperature from the entrance zone and/or slightly increasing the temperature from the entrance zone. In the meantime, substantially linear focused IR heat sources 56 supply localized heating to the perimeter of the VIG assembly so as to melt the ceramic frit applied to the edges. IR heat may be focused on peripheral edges, for example, by means of a parabolic mirror on an edge opposite to the VIG assembly. Further details of an example focusing mechanism are provided below with reference to FIG. 7. Although this particular zone is termed an edge sealing zone, it will be appreciated that some edge sealing may occur in other zones. For example, most melting will occur within the edge sealing zone and some edge sealing will take place once the IR radiation sources are powered down, although the edges may continue to seal (e.g., the frit may begin or continue to harden) while in the exit zone.

Figure 6:
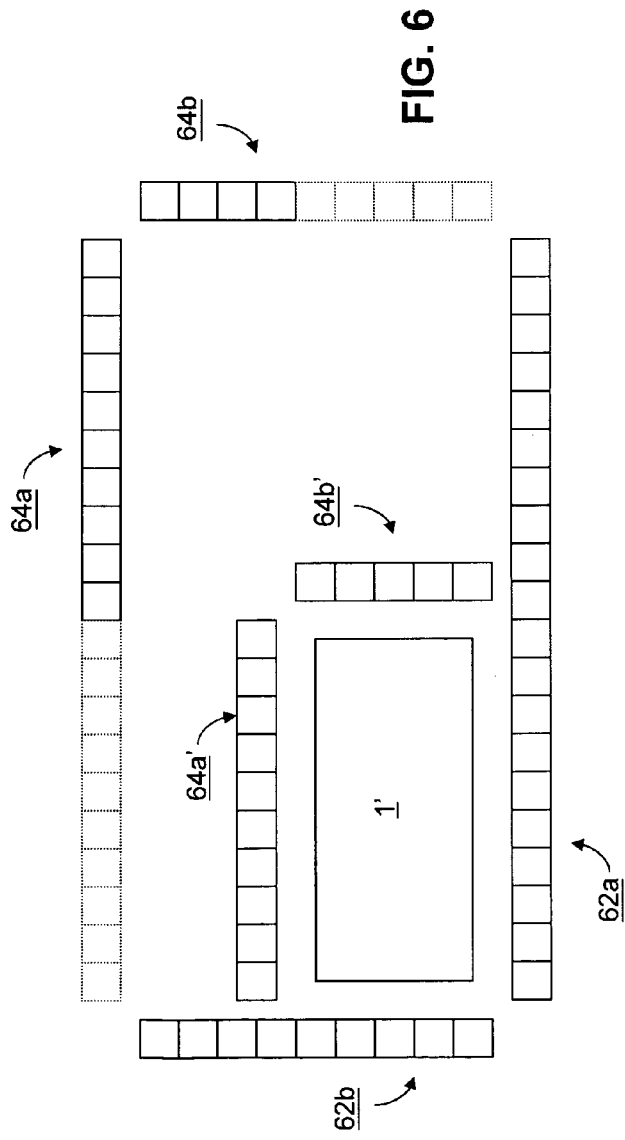
FIG. 6 is an overhead view of the moving concentration of IR heat sources in the edge sealing zone of a unitized oven in accordance with an example embodiment.

FIG. 6 is an overhead view of the moving concentration of IR heat sources 62 and 64 in the edge sealing zone of a unitized oven in accordance with an example embodiment. As shown in FIG. 6, the frit melting oven is designed such that variously sized VIG assemblies may be sealed. In certain example embodiments, one corner of the focused IR bank is fixed in position (e.g., the corner proximate to banks 62a-b). In the FIG. 6 example, banks 62a-b are fixed in position. In such example arrangements, only two sides of the focused IR bank would need to be repositioned to ensure proper frit melting. The IR sources also may be segmented into sections so that a part or all of the sections can be turned on at any time to adjust the length of heating to that of the VIG assembly size. Parts of these IR source banks 64a-b may be moved into various positions around the perimeter of the VIG assembly by mechanical means, such as, for example, arms, rollers on a rail, and/or other linkages. In FIG. 6, this is shown as banks 64a-b being segmented and bank segments 64a'-b' being moved from their initial positions (designated by the dotted lines in the banks 64a-b) to positions proximate to the VIG assembly 1' (designated by the solid lines) to be edge sealed. In the FIG. 6 embodiment, only IR sources corresponding to banks 64a'-b' and parts of 62a-b would be turned on; the rest of the IR sources in banks 64a-b and the non-proximate IR sources in banks 62a-b need not be turned on (e.g., they would may remain off).

Thus, as is shown in FIG. 6, the localized heat source comprises first, second, third, and fourth banks of infrared heat source elements, the banks being arranged such that the infrared heat source is substantially rectangularly shaped within the edge melting zone. The first and second banks are fixed in position and constitute two substantially perpendicular legs of the substantially rectangularly shaped infrared heat source, and the third and fourth banks constitute the other two substantially perpendicular legs of the substantially rectangularly shaped infrared heat source. The infrared heat source elements of the second and third banks are movable in dependence on a size of the unit so as to move closer to the edges to be sealed.

In addition, the angle of the focusing mirror may be adjustable in certain example embodiments to allow the heat to be focused more precisely on the VIG assembly perimeters (as described in greater detail below with reference to FIG. 7). In certain example embodiments, the IR segmented source movement and/or focusing may be computer-controlled to adjust the results of the individual units. Still further, the VIG assembly 1' to be edge sealed may be elevated such that it is more proximate to the IR sources. This may be accomplished by moving it into a proper X-Y position with respect to the IR banks 62a-b, moving portions of the movable IR banks 64a-b, and lifting the VIG assembly 1' into position.

By way of example and without limitation, the IR sources within the banks may be IR tubes. The IR tubes may be close enough to each to provide heating across the edges of the VIG assembly (e.g., without leaving "gaps," or unheated or substantially differently heated areas around the edges), but also may be far enough away from each other to allow for movement of such tubes. Thus, by way of example and without limitation, the IR tubes may be located approximately 5 mm apart in certain example embodiments. The sizes of the banks may vary in dependence on the needs of the VIG unit manufacturing process. Also by way of example and without limitation, banks of about 2-3 meters should accommodate most standard VIG unit manufacturing requirements.

Referring once again to FIG. 5, the VIG assembly may be cooled down in an exit zone comprising one or more chambers, e.g., in a stepwise manner via chambers 4 and 5 of FIG. 5. When a stepwise exit zone arrangement is implemented, each successive exit zone chamber may be maintained at a lower temperature than the previous exit zone chamber. This arrangement may be enabled by using forced convective air cooling, cooling water piping, and/or other cooling means suitable for removing heat from the particular exit zone chamber. Ultimately, the VIG assembly may be rolled out of the oven 50 through exit door 58 via rollers 52b.

Figure 7:
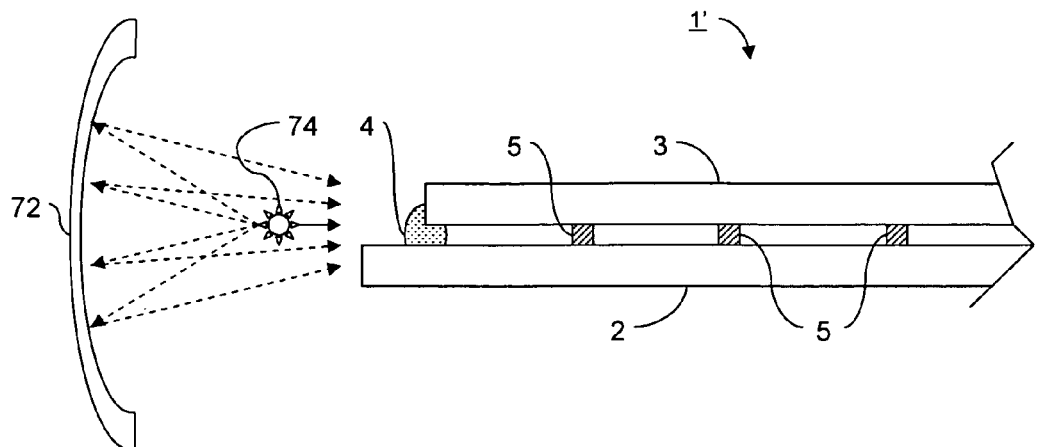
FIG. 7 is a side view of a concentration and/or focusing mirror located proximate to an IR heating element in accordance with an example embodiment.

FIG. 7 is a side view of a concentration and/or focusing mirror 72 located proximate to an IR heating element 74 in accordance with an example embodiment. It will be appreciated that any type of concentrating and/or focusing mechanism may be used in connection with certain other example embodiments. IR radiation from IR heating element 74 is focused and/or concentrated by the parabolic mirror 72 onto or proximate to solder frit 4. The mirror 72 may be moved and/or repositioned to cause more or less of the peripheral edges of the VIG assembly 1' to be heated, to focus IR radiation to or away from the substrates 2 and 3, etc.

A more detailed description of the VIG assembly edge sealing process will now be provided. A pre-assembled VIG assembly, which may include a pre-applied and fired perimeter frit ink, enters the oven. In the entrance zone, the VIG assembly is heated up to a predetermined temperature of between about 200-300° C. This may be accomplished using staged heating in one or more entrance chambers, so that the entire VIG assembly is pre-heated to one or more intermediate temperatures. In general, the VIG assembly will enter into the oven at room temperature (e.g., which typically is about 23° C., although it will be appreciated that other processing environments and/or conditions may implement a different "room temperature"). The entire VIG assembly may be heated to about 75° C. in a first entrance zone chamber and then to about 150° C. in a second entrance zone chamber. It will be appreciated that the pre-heating temperatures may vary by about ±50° C.

In the edge sealing zone, the entire VIG assembly is heated to about 200° C., and an IR heat source (e.g., a computer-controlled substantially linear IR heat source) is moved into position and focused around the perimeter of the VIG assembly. The IR heat source is activated at a predetermined distance (e.g., from about 0.5-10 cm) from the edge of the VIG assembly, depending in part on the focusing/concentrating mirror, whether the IR radiation is meant to "contact" the top and/or bottom substrates or just the sides proximate to the frit, etc. As noted above, the IR heat source is focused, e.g., by means of a parabolic mirror provided on a side of the IR heat source opposite to the VIG assembly. The temperature of the frit on the perimeter of the VIG assembly is controlled to about 350-500° C., which is suitable to melt the frit but still below the melting point of the glass substrates, which varies from about 600-800° C. based on the composition of the glass. During the localized heating process in the edge sealing zone, the glass temperature remains at the background temperature. Accordingly, heat strengthened or tempered glass, if utilized, is not de-tempered or suffers a reduced amount of de-tempering during the frit heating and/or melting processes.

Following the frit melting in the edge sealing zone, the VIG assembly is transported to the exit zone. The exit zone may include one or more temperature ramp-down areas (or chambers). The temperature is reduced so that the VIG assembly is at a temperature less than about 100° C. when it exits the oven. In certain example embodiments, in a first exit chamber, the temperature of the entire VIG assembly will be reduced to about 150° C. and then to about 75° C. in a second exit chamber. As above, ramp-down temperatures may vary from these figures by as much as about ±50° C.

Figure 8:
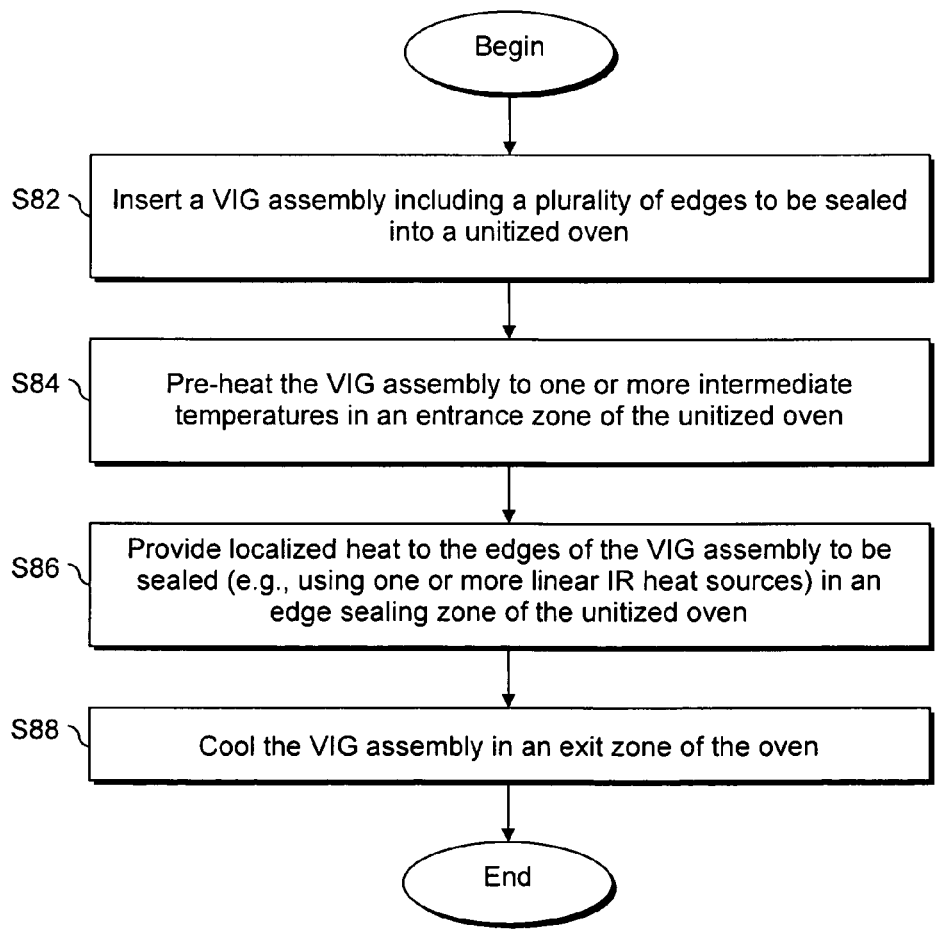
FIG. 8 is an illustrative flowchart showing a process for providing localized heating to frit edge seals of a VIG assembly via a unitized oven, in accordance with an example embodiment.

FIG. 8 is an illustrative flowchart showing a process for providing localized heating to frit edge seals of a VIG assembly via a unitized oven, in accordance with an example embodiment. In step S82, a VIG assembly including a plurality of edges to be sealed is inserted into a unitized oven. A roller conveyer may convey the VIG assembly into the oven, e.g., through a door. In step S84, the VIG assembly is pre-heated to one or more intermediate temperatures in an entrance zone of the unitized oven. The intermediate temperature(s) is/are below the melting points of glass and the frit along the edge to be sealed.

Localized heat is provided to the edges of the VIG assembly to be sealed (e.g., using one or more substantially linear IR heat sources, producing IR radiation having a near infrared wavelength (e.g., a wavelength of about 0.7-5.0 µm) and, more preferably, of about 1.1-1.4 µm) in an edge sealing zone of the unitized oven in step S86. The localized heat is at a temperature above the intermediate temperature(s) and is sufficient to cause the frit around the edges to melt. The temperatures may be chosen in dependence on the composition of the frit material. The VIG assembly, apart from the areas proximate to the peripheral edges to be sealed, are kept at a temperature close to that of the intermediate temperature (e.g., at a temperature sufficiently low so as to avoid melting of the glass, not varying by more than about ±50° C. from an intermediate temperature).

In a step not shown, to provide localized heating, a plurality of heat sources (e.g., substantially linear IR heat sources) are provided, e.g., within a bank. At least some of the banks may be fixed in position. The VIG assembly may be positioned proximate to the fixed banks so that at least some of the edges to be sealed are adjacent to the fixed banks. Additional banks including movable heat sources may be positioned so as to provide heat proximate to the edges of the VIG assembly that are not adjacent to the fixed banks. The areas to be heated may be more finely tuned by providing a concentration and/or focusing mirror.

Referring once again to FIG. 8, in step S88, the VIG assembly is cooled in an exit zone of the oven. The pre-heating and/or cooling of the VIG assembly may be staged so as to reduce the chances of breakage of the VIG assembly and/or de-tempering of the substrates comprising the VIG assembly. In certain example embodiments, multiple chambers may be provided for one or more of the zones. In connection with such embodiments, multiple chambers may be provided for the ramping-up of temperatures and/or the cooling processes, e.g., when the heating and/or cooling processes are staged. In certain other embodiments, a single chamber may be configured to perform the functionality of multiple zones (e.g., a single chamber may pre-heat and/or cool the substrate, a single chamber may pre-heat the substrate and/or provide localized heat to the edges, a single chamber may provide localized heat to the edges and/or cool the substrate, etc.).

Thus, certain example embodiments advantageously heat, melt, and cool the frit quickly. This helps produce a temperature gradient proximate to the edges of the VIG assembly. The temperature gradient, in turn, helps reduce de-tempering and/or the chances of breakage of the glass. In certain example embodiments, at least certain portions of a thermally tempered glass sheet(s)/substrate(s) of the VIG unit lose no more than about 50% of original temper strength.

Certain example embodiments provide heat to the edges of the VIG using a localized heat comprising an array of focused IR heat sources so that while the non-edge areas remain at relatively low temperature, the frit around the perimeter is melted. The array of IR heat sources reduces the number of moving parts in the localized heating source and does not necessarily require separation between temperature zones some embodiments. The array is installable into a standard belt furnace relatively easily. Another advantage of this design is that it can be used to produce VIG units of various sizes and shapes (e.g., substantially rectangular and substantially non-rectangular shaped VIG units of varying sizes).

Instead of, or in addition to, implementing system of movable heat sources, certain example embodiments may provide localized heating by a substantially stationary array of focused IR sources installed an in-line furnace, such as belt furnace or "coffin" style furnace. The array includes a matrix of W*L number of spot IR sources, each of which covers a fixed area. The On/Off behavior of the spot IR sources may be individually controlled by a computer so that each spot on the edge will be illuminated by the IR sources for a pre-determined fixed total energy, e.g., equal to the amount required to melt the frit. The width of the array may cover the whole effective width of the belt, and the length of the array may provide sufficient heating to melt the frit. The length of the array can be estimated by the equation:

$$E = L*D/V$$

where E is the total energy per unit area used in melting the frit, L is the length of the array, D is the power density of the IR source, and V is the furnace line speed.

The operation of the array of IR sources will now be described in greater detail with reference to FIGS. 9a-9f. For convenience, the individual heat sources will be identified using a naming scheme where each individual source is designated as #LW, with the L- and W-axes being numbered as "1" at the intersection thereof shown in FIG. 9a. Thus, for example, in FIGS. 9a-9f, the upper-left heat source is #98, and the bottom-right heat source is #11.

Figure 9A:
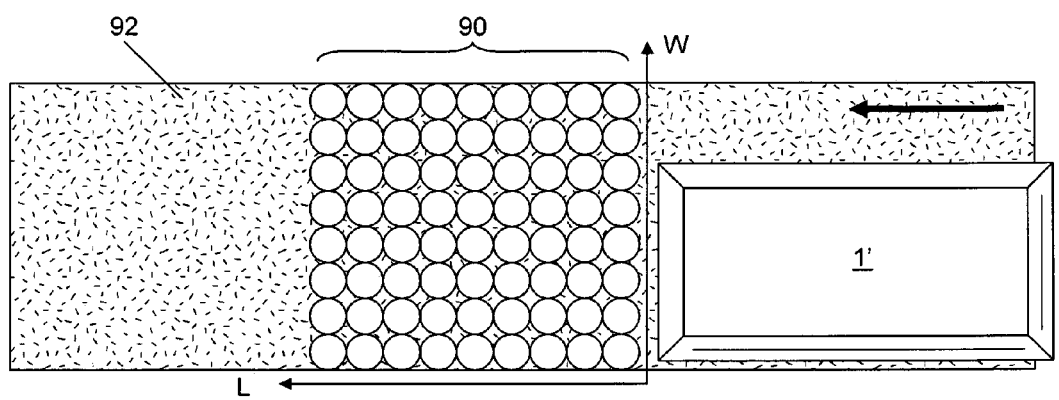
FIG. 9a is an overhead view of the VIG assembly on a belt in an oven prior to its entry under the IR source array, in accordance with an example embodiment.

FIG. 9a is an overhead view of the VIG assembly 1' on a belt 92 in an oven prior to its entry under the IR source array 90, in accordance with an example embodiment. Before the VIG assembly 1' goes under the IR source array 90, all IR sources are turned off (e.g., as designated by all circles in the IR source array 90 being greyed-out).

Figure 9B:
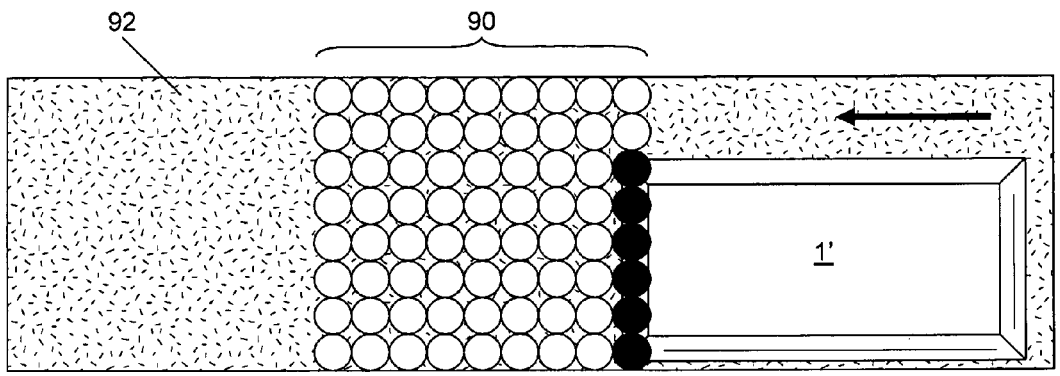
FIG. 9b is an overhead view of the VIG assembly on a belt in an oven entering into the IR source array, in accordance with an example embodiment.

FIG. 9b is an overhead view of the VIG assembly 1' on a belt 92 in an oven entering into the IR source array 90, in accordance with an example embodiment. When the leading edge of the VIG assembly 1' is under the array, the IR sources covering the edge of the VIG assembly 1' to be sealed are turned on. Thus, in the FIG. 9b example, units #11 to #16 are turned on, as designated by the darkened circles. At this time, the other sources in the IR source array 90 remain off.

Figure 9C:
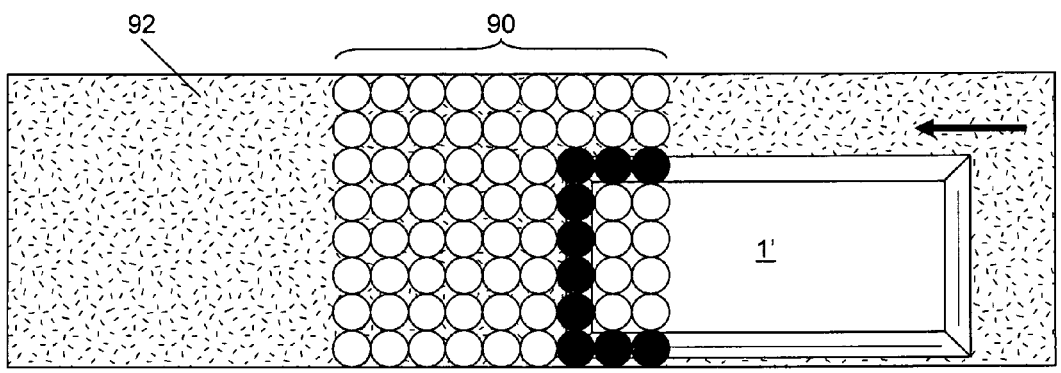
FIG. 9c is an overhead view of the VIG assembly further entering the IR source array such that both the edge to be sealed along the minor axis of the VIG assembly and portions of the edges to be sealed along the major axis of the VIG assembly are both exposed to IR from the IR source array, in accordance with an example embodiment.

FIG. 9c is an overhead view of the VIG assembly 1' further entering the IR source array 90 such that both the edge to be sealed along the minor axis of the VIG assembly 1' and portions of the edges to be sealed along the major axis of the VIG assembly 1' are both exposed to IR from the IR source array 90, in accordance with an example embodiment. As shown in FIG. 9c, the VIG assembly 1' further enters the array region, and the IR sources switch from W=1 to W=2 and then to W=3 to follow the leading edge. In the mean time, #11, #21, #16 and #26 remain "on" because the edges to be sealed along the major axis of the VIG assembly 1' are to be exposed to heat.

Figure 9D:
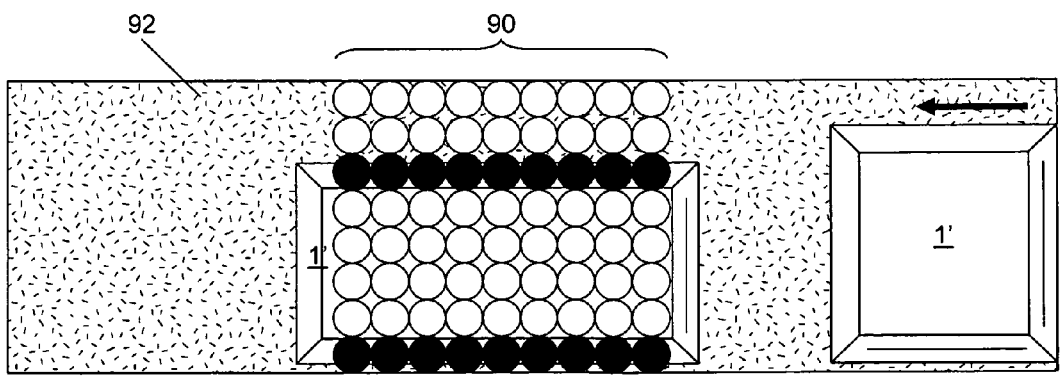
FIG. 9d is an overview of the VIG assembly further entering the IR source array such that only the edges to be sealed along the major axis of the VIG assembly are exposed to IR from the IR source array, in accordance with an example embodiment.

FIG. 9d is an overview of the VIG assembly 1' further entering the IR source array 90 such that only the edges to be sealed along the major axis of the VIG assembly 1' are exposed to IR from the IR source array 90, in accordance with an example embodiment. Once only the side edges are under the array, the "On" pattern becomes two parallel lines in the moving direction, and all other heat sources are turned "Off." As shown in FIG. 9d, a second VIG assembly 1' having edges to be sealed is coming down the belt 92 towards the array.

Figure 9E:
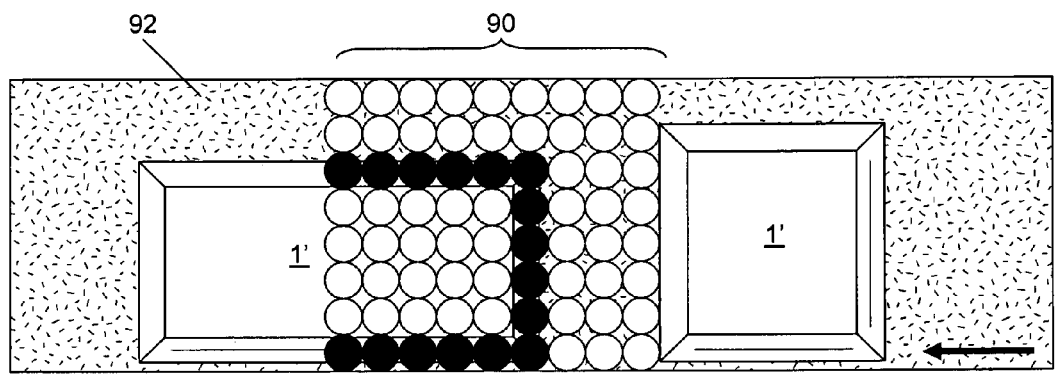
FIG. 9e is an overhead view of the VIG assembly exiting the IR source array, in accordance with an example embodiment.

FIG. 9e is an overhead view of the VIG assembly 1' exiting the IR source array 90, in accordance with an example embodiment. As the trailing edge enters the array, the column L=1, 2, 3, . . . , will be turned on again in this order for the trailing edge. The whole column will be completely off after the trailing edge passes until the next assembly 1' enters. By the time the VIG assembly 1' leaves the array region 90, every spot on the perimeter has received a substantially equal amount of energy sufficient to melt the frit.

Figure 9F:
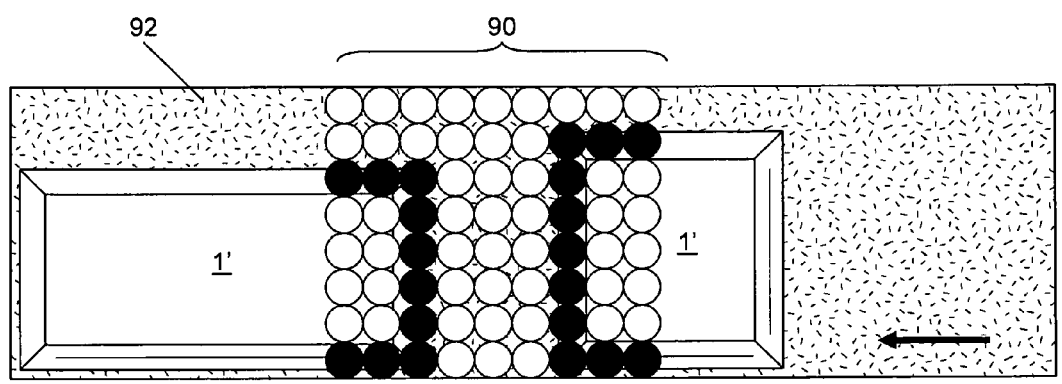
FIG. 9f is an overhead view of a second VIG assembly entering the IR source array as a first VIG assembly exits the IR source array in accordance with an example embodiment.

FIG. 9f is an overhead view of a second VIG assembly 1' entering the IR source array 90 as a first VIG assembly 1' exits the IR source array 90 in accordance with an example embodiment. As can be seen from FIG. 9f, the first and second VIG assemblies 1' are differently sized. Thus, when the second VIG assembly 1' enters the array region, the process will repeat, except that row W=7 will be on because of larger width for the second unit.

Thus, it will be appreciated that each heat source in each row and column of the array is selectively activated in dependence on whether an edge to be sealed is proximate to the heat source (e.g., within an area of heat produced by the heat source). It also will be appreciated that the array is substantially two-dimensional.

The determination of which sources to be turned on may be pre-programmed by an operator in certain example embodiments. In certain example embodiments, photo-eye or other detecting mechanisms may be used to determine the size and/or position of the VIG assembly, e.g., to determine the heat sources in the array to be turned on and the time at which they should be turned on.

It will be appreciated that the energy intensity produced by a single IR heat source (e.g., in an array) is substantially normally distributed across an area such that the energy emitted is highest at the center of the area. Thus, an arrangement that incorporates an array of spaced-apart IR heat sources may sometimes create "stripes" of high and low energy areas. Sometimes, this may result in localized and non-localized melting. That is, sometimes just enough or too much energy will be applied to a certain area or areas, while not enough energy will be provided to an adjacent area or areas.

Figure 10:
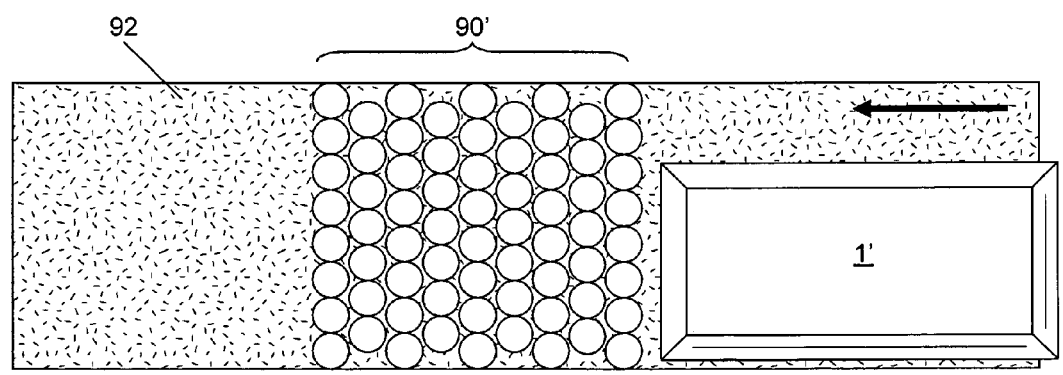
FIG. 10 is an overhead view of an IR source array incorporating a staggered IR heat source design, in accordance with an example embodiment.

Accordingly, certain example embodiments may incorporate an array of IR heat sources where the heat sources are staggered. FIG. 10 is an overhead view of an IR source array 90' incorporating a staggered IR heat source design, in accordance with an example embodiment. In FIG. 10, the individual heat sources in the array 90' are arranged such that, moving left-to-right, the southeast section of the first heat source is adjacent to the northwest section of the second heat source, and the northeast section of the second heat source is adjacent to the southwest section of the third heat source, etc. This and/or other arrangements may advantageously help provide alternating high and low exposure areas to even out the striping that sometimes may otherwise occur. The staggered IR heat source design of FIG. 10 operates in substantially the same was as the design of FIGS. 9a-9f.

In certain example embodiments, diffusers may be placed proximate to each lamp so as to even out the energy, which otherwise sometimes might be provided according to a particular shape (e.g., circular shape where circular lamps are used) or in stripes as noted above, thus providing a substantially uniform distribution of heat across the area to be heated. Generally, a diffuser may be provided to each heat source in the array to provide a more uniform heat flux from the heat sources in the array. It will be appreciated that diffusers may be used in connection with either the array design of FIGS. 9a-9f and/or the array design of FIG. 10.

Figure 11A:
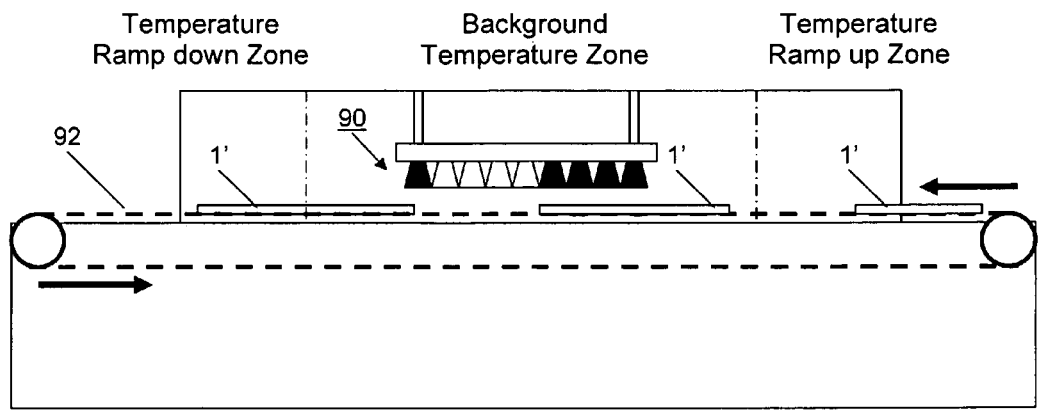
FIG. 11a is a side view of an in-line style belt furnace installed with an array of IR sources in accordance with an example embodiment.

FIG. 11a is a side view of an in-line style belt furnace installed with an array 90 of IR sources. Pre-assembled VIG assemblies 1' enter the furnace and are heated up through a temperature ramp-up zone to reach the predetermined background temperature (typically between about 200-300° C.). An IR array 90 is installed in this background temperature zone and melts the frit around the perimeter of the VIG assemblies 1' in a process described above or other process. During the whole time, the furnace belt 92 may be moving continuously at a constant speed selected to provide sufficient heating to the perimeters of the VIG assemblies 1' to ensure good hermetic seals around the edges of the VIG assemblies 1'. The pumping port tube seal, if necessary, can also be sealed in the same or other fashion using the IR array 90 at the same time. The individual IR heat sources are switched on and off by computer-control to provide adequate preferential heating to the edges of the VIG assemblies 1'. The temperature of the frit on the edge of the VIG assemblies 1' is controlled between about 350-500° C., suitable to melt frit but below glass melting point. In the meantime, the glass temperature remains at or close to the background temperature. The VIG assembly 1' is then transported through temperature ramp down zones until it cools down, e.g., to less than about 100° C. when it exits the oven. As noted above, the zones may be separate chambers or they may be the same chambers in certain example embodiments.

It will be appreciated that when turning on a single IR heat source, the energy produced is substantially normally distributed over time. Thus, the energy will often ramp-up, stabilize, and then ramp-down. Accordingly, in certain example embodiments, a computer-controlled system may advantageously turn on a single lamp before the VIG assembly is underneath it to ensure that the intended energy reaches the area, and/or also turn off the lamp before the VIG assembly exits to reduce the exposure to adjacent areas that should not be heated. Thus, as the unit moves across successive columns of the array, each heat source is activated in the row and column of the array before the edge to be sealed is exposed to heat emanating from the heat source and also deactivated before the edge to be sealed is removed from the heat emanating from the heat source.

Figure 11B:
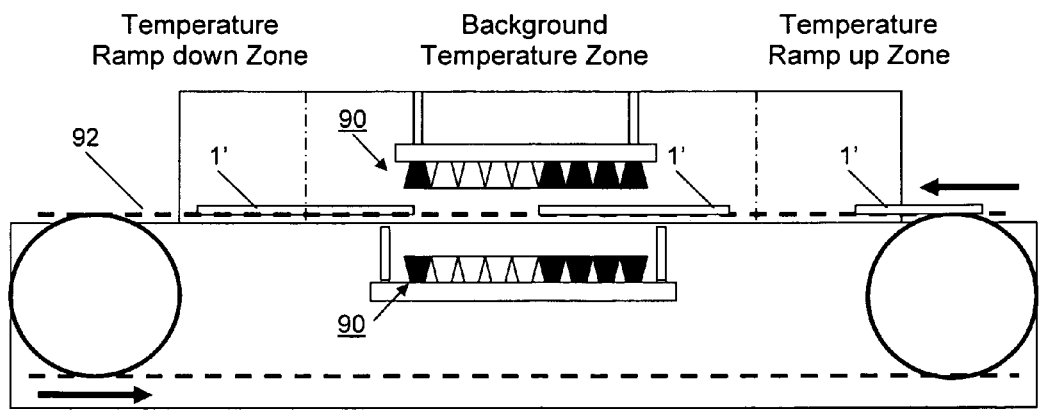
FIG. 11b is a side view of an in-line style belt furnace installed with two arrays of IR sources in accordance with an example embodiment.

FIG. 11b is a side view of an in-line style belt furnace installed with two arrays 90 of IR sources in accordance with an example embodiment. For example, an additional array may be provided between the belt and point upward so that the two arrays heat the edges to be sealed from both sides. That is, heat may be applied to both sides of the frit to ensure faster and/or more uniform melting thereof. The two arrays 90 may be controlled in the same way by the same or different means to ensure that the edges become sealed. Alternatively, a slight delay between on-off cycles or slightly different on-off configuration may be introduced between arrays, e.g., to help reduce the striping problem described above.

The above-described and/or other example embodiments may involve a tunable IR heat source operable to impart a substantial portion of energy in that wavelength range. The IR heat source may be used to selectively heat an applied material such as, for example, a film, application, paint, solder glass, metal, metal and/or ceramic coating, bead, profile, etc., that has been applied to a glass or ceramic substrate surface to a prescribed temperature, thereby causing a desired physical and/or chemical change (such as, for example, melting, sintering, chemical property change, outgassing, etc.).

In certain example embodiments, an arrangement of heating elements is provided in a configuration that imparts localized or diffuse energy transfer to an area of interest. In certain example embodiments, IR bulbs may be designed to create a predetermined spectral response. The IR bulbs may be further fine-tuned via voltage adjustments. Thus, it may be possible to produce a desired peak wavelength, e.g., by providing bulbs that create an approximate spectral response and by providing voltage adjustments to further fine-tune at least the peak wavelength(s). This approach is advantageous in certain example implementations, as voltage changes may be finely controlled, e.g., in small increments, thereby resulting in smaller overall power consumption, a reduced amount of electrical stress on the system, etc.

The bulbs may be made to emit a certain peak wavelength if their elements (e.g., tungsten or other elements) are adjusted in terms of distance and/or cross-sectional area. These dimensional changes may help to change the resistance and thus the heat produced and, in turn, affecting the spectrum of the emitted energy. As alluded to above, IR light in the near infrared (NIR) and/or short-wave infrared (SWIR) bands may be used. Such spectra commonly encompass wavelengths of, for example, 750-1400 nm and 1400-3000 nm, respectively. Some frits usable in VIG applications may be tuned to absorb energy in this range. It also is possible to tune such frit materials (e.g., through the use of pigments and/or additives) such that it has a relatively flat absorption across a spectrum where the glass substrate that supports it has a relatively low absorption. Thus, in certain example embodiments, the elements may be tuned away from wavelength ranges of high absorption for the glass, and towards wavelength ranges of high or peak absorption for the frit. In certain example embodiments, wavelengths of from about 1300-1700 nm have been found to be advantageous in that frit materials are highly absorptive in this area, whereas absorption by the glass is relatively low. As indicated above, these elements may be further tuned by changing the voltage so as to control the frequency at which they emit the most energy.

Figure 12:
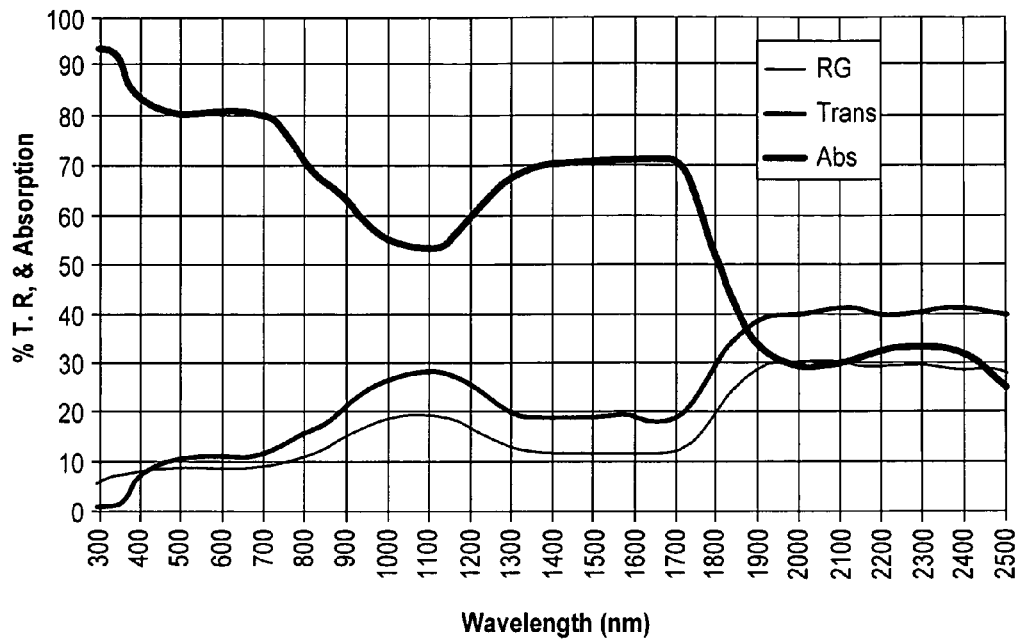
FIG. 12 is a graph that plots transmission, reflection, and absorption vs. wavelength for an example glass frit.

FIG. 12 is a graph that plots transmission, reflection, and absorption vs. wavelength for an example glass frit. As can be seen, the frit is optimized for heating via an IR wavelength of 1300-1700 nm. In certain example embodiments, the frit material may be a vanadium-based frit material. See, for example, application Ser. No. 12/929,875, entitled "VANADIUM-BASED FRIT MATERIALS, AND/OR METHODS OF MAKING THE SAME", the entire contents of which are incorporated herein by reference. Other frit materials may be used including, for example, Ferro 2824B and 2824G frits. See, for example, application Ser. No. 12/929,874, entitled "IMPROVED FRIT MATERIALS AND/OR METHOD OF MAKING VACUUM INSULAT- ING GLASS UNITS INCLUDING THE SAME". Other so-called "lead-free" frits may be used in different embodiments.

Figure 13:
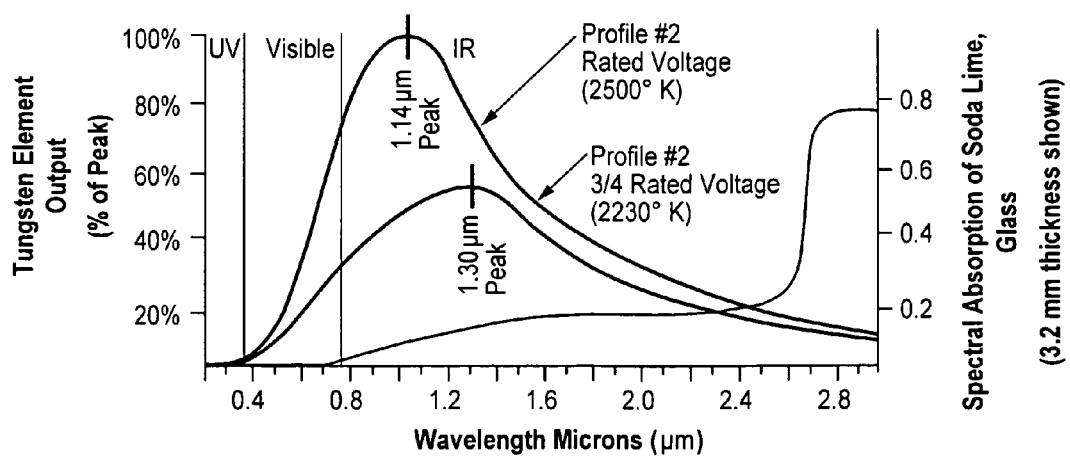
FIG. 13 is a graph showing glass absorption vs. wavelength for 3.2 mm clear float glass.

FIG. 13 is a graph showing glass absorption vs. wavelength for 3.2 mm clear float glass. FIG. 13 also shows example profiles for tungsten element outputs operating at different peak wavelengths. As can been see, glass absorption increases gradually until just over 2.5 micron wavelengths, where the jump is approximately vertical. Thus, it is desirable to tune the IR heating elements (and the IR frit compositions) towards the NIR and/or SWIR bands and, for example, to peaks around 1.14 or 1.30 microns, where IR absorption is relatively is comparatively low. In certain example embodiments, the frit is tuned to a wavelength such that it absorbs at least about twice as much heat from the IR elements compared to the glass substrate, more preferably at least about three times as much heat, and still more preferably 3.5 or more times as much heat.

Figure 14:
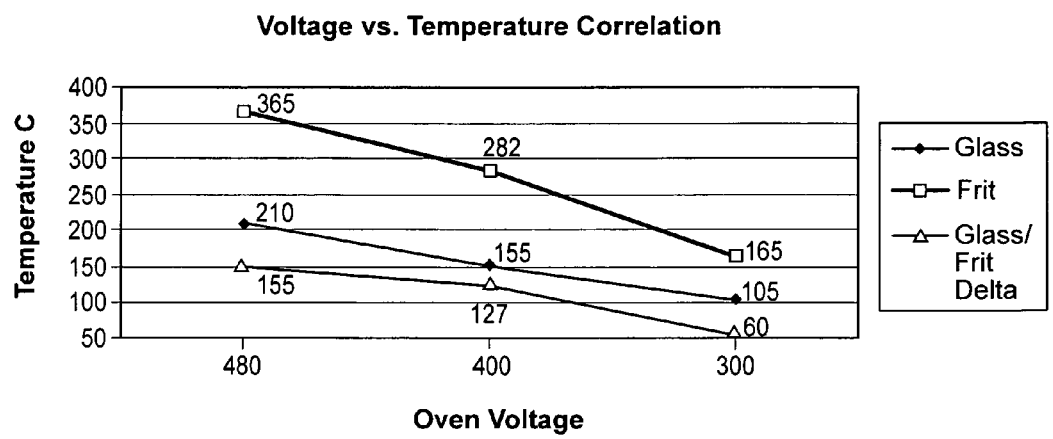
FIG. 14 correlates voltage with temperature for example IR heating elements.

FIG. 14 correlates voltage with temperature for example IR heating elements. As can be seen, the higher the voltage, the lower the temperature. It also can be seen that the glass remains at a temperature lower than the frit for all voltages. As will be appreciated, a high glass/frit temperature difference is desirable in certain example embodiments. And as explained above, this may be accomplished by tuning the peak output from the IR heating element(s) towards the fries range of absorption and away from the glass's range of absorption.

The distance between the element and the part to be heated also may be adjusted so as to control the energy flux, e.g., in adjusting the heating profile. In other words, in certain example embodiments, it is possible to adjust the vertical distance between the IR emitters and the part to be heated. Jack screws or the like may be used to accomplish such movement. The movement may be manual or automatic in certain example embodiments. It will be appreciated that in certain example embodiments, the IR emitters may be provided in a fixed vertical position relative to the part to be heated. In general, a distance of about 2-10", more preferably 3-6", and sometimes about 4" from the top of the glass of a VIG unit may be desirable.

The energy flux also may be adjusted by changing the distance between adjacent heating elements. In certain example implementations, a 2-6" (and sometimes 4") center-to-center distance may be provided for adjacent bulbs. It has been found that this example center-to-center distance is advantageous in that an appropriate amount of heat is produced. Placing the bulbs too close together may produce too much heat for the frit material and/or the substrates.

The emitters may be provided at different angles relative to the target area to be heated in different embodiments of this invention. For instance, in an example stationary oven where items are simply inserted or removed, an approximately 90 degree bulb angle (e.g., ±15 degrees) relative to the surface on which they are mounted (e.g., a surface directly above the part to be heated) was found to be advantageous in terms of producing a desired heating profile. By contrast, in an example oven where products moved in and out on a roller-based conveyor system, approximately 45 degree angles (e.g., ±15 degrees) for the bulbs were found to be advantageous in terms of producing a desired heating profile. That is, certain example embodiments may use generally elongate bulbs that are generally horizontally oriented with a chamber, and with those bulbs being generally perpendicular to or angled towards/away from upper and/or lower surfaces of the VIG subassembly. In certain example embodiments, the bulbs may be provided above and/or below the VIG subassembly.

In certain example embodiments, one or more backing or other mirrors may be used to help focus heat generated by the IR element(s).

The heating elements themselves may be cooled by convective, conductive, and/or other cooling means in certain example embodiments.

The applied material to be heated (e.g., the frit slurry that may include ceramic materials, a water or other solvent base vehicle and binder; paint; a coating; solder glass; metals; metallic and/or semiconductor coatings including, for example, pyrolytic or sputtered films; etc.) may absorb energy and heat up at a faster rate than the glass or ceramic substrate by which it is supported. This selective heating is advantageous in that the heat has a reduced effect on the substrate properties, e.g., as related to the lower buildup of heat compared to the applied material. Thus, it will be appreciated that if the substrate is heat treated (e.g., heat strengthened or tempered glass), the bulk properties may be largely unchanged, given that the frequency at which energy is imparted to the part is targeted at the applied material rather than the glass substrate.

Figure 15:
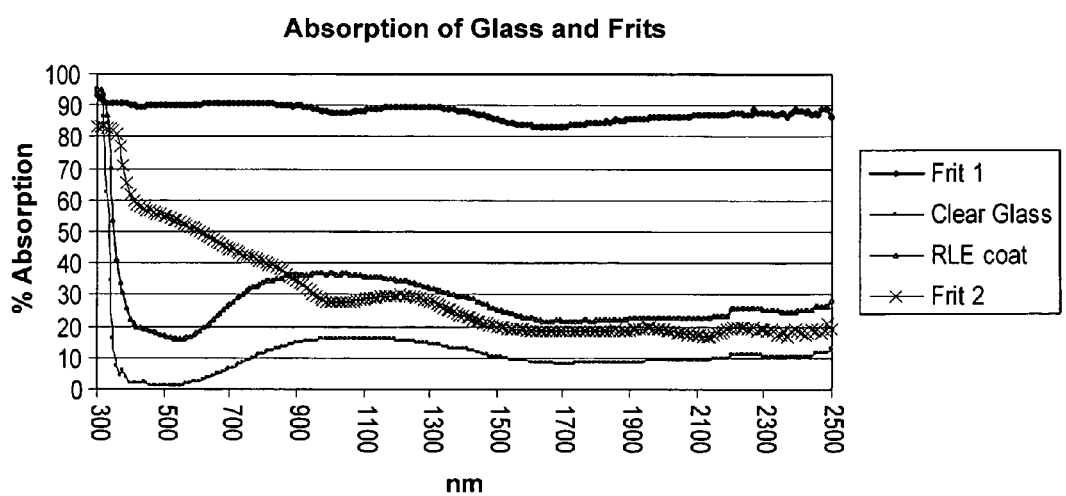
FIG. 15 is a graph with absorption properties of a frit material according to certain example embodiments.

FIG. 15 is a graph with absorption properties of a frit material according to certain example embodiments. The illustrative graph shows absorption percentage versus wavelength in nanometers. Two different frit materials are shown, frit 1 and frit 2. Frit 1 is an improved frit material according to certain example embodiments of application Ser. No. 12/929,874, the entire contents of which are hereby incorporated herein by reference, and frit 2 is a conventional frit material. Also shown are two different types of glass. The first is a conventional clear float glass. The second (RLE-coated glass) is a coated glass substrate, although it will be appreciated that different example embodiments may use different low-E coatings. As can be seen from the graph, frit 1 includes increased absorption properties versus frit 2. Indeed, frit 1 maintains an absorption percentage above 80% for the length of the illustrated graph and at or near 90% for a substantial portion of the graph. Conversely, frit 2 has a maximum absorption in the 300 nm wavelength range and subsequently drops off quickly until maintaining about 20% absorption in the medium to long wave length IR regions.

As shown, frit 2 possesses absorption properties similar to those found in the glass substrates. Accordingly, when frit 2 is disposed on such glass substrates, both the glass and the frit may absorb similar amounts of IR energy. The similar absorption properties of the IR energy may lead to both the frit and the glass substrates having similar heating profiles. In contrast, the absorption properties of frit 1 provide a substantially increased ability to absorb IR energy. Accordingly, in certain example embodiments, a frit material with a high IR absorption percentage may be provided, for example above about 80%, or preferably above 85%, and even more preferably above about 90%, for at least a substantial portion of the IR wavelengths in question. It will be appreciated, of course, that a frit material having 50% or 75% IR absorption also is possible in certain example implementations.

Although the selective or preferential heating of an area is advantageous, the inventors of the instant application have also observed that the heating profile of the article as a whole matters. As indicated above, de-tempering is a risk for monolithic articles. However, the inventors of the instant application have observed that the risk is heightened for VIG units. In other words, substrates used in VIG units are more sensitive to de-tempering than their monolithic glass substrate counterparts. Thus, certain example embodiments help ensure that substrate temperature preferably is no higher than 375 degrees C. for 1 minute, more preferably no higher than 350 degrees C. for 1 minute, and still more preferably no higher than 325 degrees C. for 1 minute.

In addition, a uniform temperature control across the glass substrate as a whole also impacts the end performance. Thus, uniformity of heating across frit and the substrate is desirable. Such uniformity is advantageous in helping to avoid the creation of "hot spots" or areas of localized over-heating. Such hot spots may cause de-tempering of the glass substrates, the formation of bubbles or air pockets in the frit, the over-firing of the frit, etc. Preferably, the substrate surface and/or frit has a temperature that differs by no more than ±5 degrees C., more preferably by no more than ±2 degrees.

It has been found that the inner surfaces of the chamber used for IR heating can cause reflections of the IR beams. These reflections also may cause "hot spots," potentially in or on the frit and/or substrate, and thus may reduce the overall temperature uniformity within the chamber and/or on the substrates. Certain example embodiments thus help control the temperature of the glass and the frit by creating a diffuse pattern of energy by altering the surface characteristics of certain surfaces within the chamber. The changes to these surfaces also may help reduce the impact of reflections off of the glass surfaces.

More particularly, certain example embodiments may incorporate "hazy" inner wall surfaces that helps reduce directed reflections and/or helps create a more diffuse pattern of reflections. This may be accomplished by providing an inner wall of a hardened high temperature resistant batt material, rather than a more "shiny" (and thus reflective) metal material. In certain example embodiments, the batt material may be a high-temperature silica-based rock wool or like material. The hardened batt material has a higher haze and thus helps to create a more diffuse pattern of radiation which, in turn, leads to more uniformity in heating. Further insulation may be provided around the inner batt walls. In certain example embodiments, the inner wall material may have low reflectivity in at least the IR range, e.g., less than 50%, more preferably less than 25%, still more preferably less than 20%, possibly less than 10-15%, and sometimes even lower. In such cases, the reduced amount of IR may be reflected in a diffuse pattern.

Preheating may be provided in certain example embodiments by virtue of convection or other heating means, although certain example embodiments do not involve preheating. Instead, the chamber may be kept at an elevated temperature (e.g., of 100 degrees C.) and some or all of the glass may be heated by the IR heating element(s) alone. In such cases, the IR heating element(s) may be operated at 50% voltage for pre-heating some or all of the glass and/or for maintaining the elevated (e.g., 100 degree C.) temperature, whereas an increased 70-80% voltage may be provided for the actual sealing process. In certain example embodiments, 50% and 80% voltages may be provided for these two modes, although the voltage may vary somewhat, e.g., preferably ±10%, more preferably ±5%. As shown in detail below, the 50% and 80% voltages are surprising and unexpected.

As alluded to above, the density of IR irradiation was a large factor in causing detempering. In sum, the use of full lamps to produce short recipe times resulted in almost complete detempering of the VIG, whereas the use of half bulb power density (50% bulb usage) retained temper the best for both coated and clear glass and almost equal breakage. Surprisingly and unexpectedly, IR voltage at half bulb density (50% bulb usage) had the best temper retention at 50% and 80%. The other voltages resulted in greater temper loss based on breakage patterns.

Thermal profiles were developed using the following techniques:
1. Started at 100 degrees C. using convection heat to warm the glass.
2. The convection fan was turned off. The glass was allowed to stabilize for 2-3 minutes. This reduced the temperature non-uniformity from the convection air flow issues with the SWIR.
3. The time and IR voltage was adjusted to provide 3 minute heat up to 275 degrees C. and then hold for 3 minutes to allow glass/frit to stabilize to 275 degrees C.
4. A ramp based on the voltage matrix targeted 350 degrees C. peak temperature, for a full bulb (100% bulb usage) at 40%, 50%, and 60% voltages, and for half bulbs (50% bulb usage) at 50%, 60%, 70%, 80%, 90% voltages.
5. IR voltage adjusted to hold for 1 minute at 350 degrees C. temperature.
6. The cool down had maximum air injected 30 seconds after IR was reduced. This increased the oven and glass cool down to minimize the effect of heat on detempering.

The 19 thermocouple system was used to measure the temperature. The IR voltage was adjusted accordingly to obtain best possible temperature uniformity. Approximately 10 degrees C. (±5 degrees C.) uniformity was obtained for the ramp up and peak hold.

After all the profiles were completed, each was run with coated (78/31)/clear 14×20 standard tempered glass mated together (no frit). It will be appreciated, however, that different example embodiments may incorporate different heat treatable and/or other double-, triple-, or quad-silver based coatings. Breaks were done with spring punch, 1 inch inboard in the middle of the long perimeter.

Cool down of the oven was found to be a significant source of breakage. Accordingly, certain example embodiments may include air pipes installed into the oven. In certain example implementations, 70-80 cfm of air may be provided to the oven when the valve is on, thereby helping to remove some of the heat generated during ramp-up and also helping to more quickly cool the glass.

As indicated above, certain example embodiments do not require convection heat during ramp-up and, instead, only IR heating is used. The example technique of allowing the glass to reach 100 degrees C. and then turning off the heaters and fan allows the elements to be cooler and have less latent heat left during the cool down process. Thus, these techniques may in certain example instances help reduce the heat load from the oven mass and heating elements so there is a lower total amount of heat to extract during cool down.

The following table summaries the breakage per the voltage and bulb parameters, and the actual recipes and thermal profiles are provided below.

| Bulb Density | IR Voltage Setup | Coated Std Temper | Clear Std Temper |
|---|---|---|---|
| Full | 40% | Totally detempered | Severely detempered |
| Full | 50% | Totally detempered | Severely detempered, best of the full IR |
| Full | 60% | Totally detempered | Severely detempered |
| Half | 50% | Smallest breaks, good | Smallest breaks, good |
| Half | 60% | Moderately detempered | Moderately detempered |
| Half | 70% | Moderately detempered better than 60% | Moderately detempered better than 60% |
| Half | 80% | Small breaks, almost as good as 50% half bulb | Small breaks, almost as good as 50% half bulb |
| Half | 90% | Most detempered of half bulb series | Most detempered of half bulb series |

Given this example data, several observations may be made in terms of IR voltage and density based on "equal" thermal profiles. The full bulbs (100% bulb usage) caused severe detempering in both lites, with the coated articles being most effected (completely detempered). The half bulbs (50% bulb usage) had a more equal impact on both coated and clear products and had less of a detempering effect.

In general, the half bulbs (50% bulb usage) had two best temper breakage regions, at voltage of 50% and 80%. The half bulb density (50% bulb usage) involves 2,000 watt bulbs spaced 4 inches apart, with a distance of the glass to the bulb of 4 inches. In certain example embodiments, it may be advantageous to avoid significant overlaps of IR energy from the IR bulbs. The temper breakage for all trials showed a good uniformity of breakage across the 14×20 sheets, indicating adequate temperature uniformity for uniform heating/cooling.

Figure 16A:
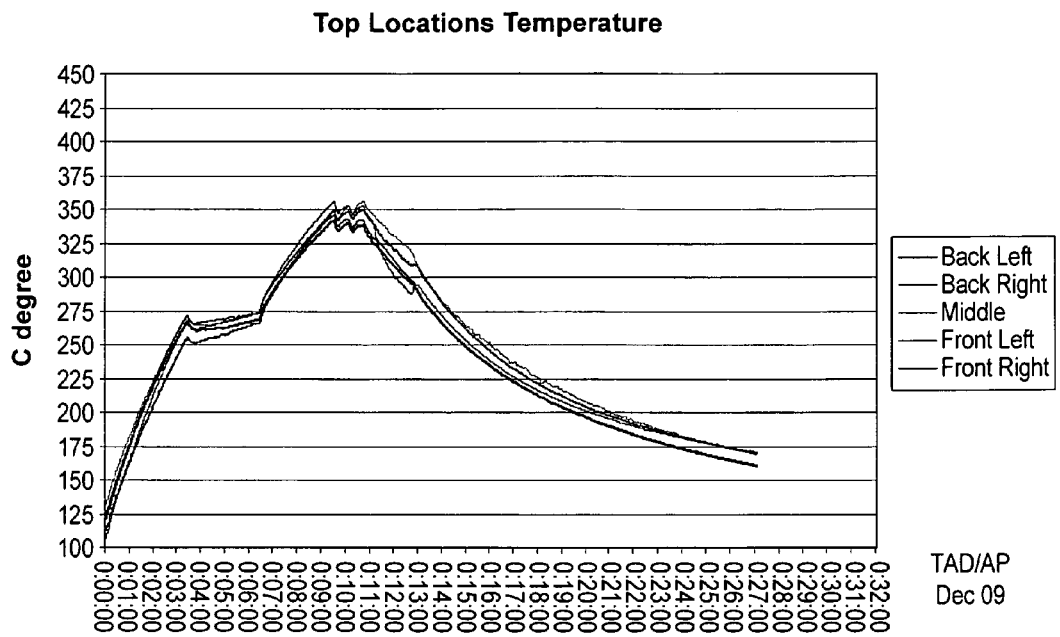
FIGS. 16a-b are graphs that plot temperature vs. time for top and bottom locations, respectively, for a 40% voltage, full bulb (100% bulb usage) trial.
Figure 16B:
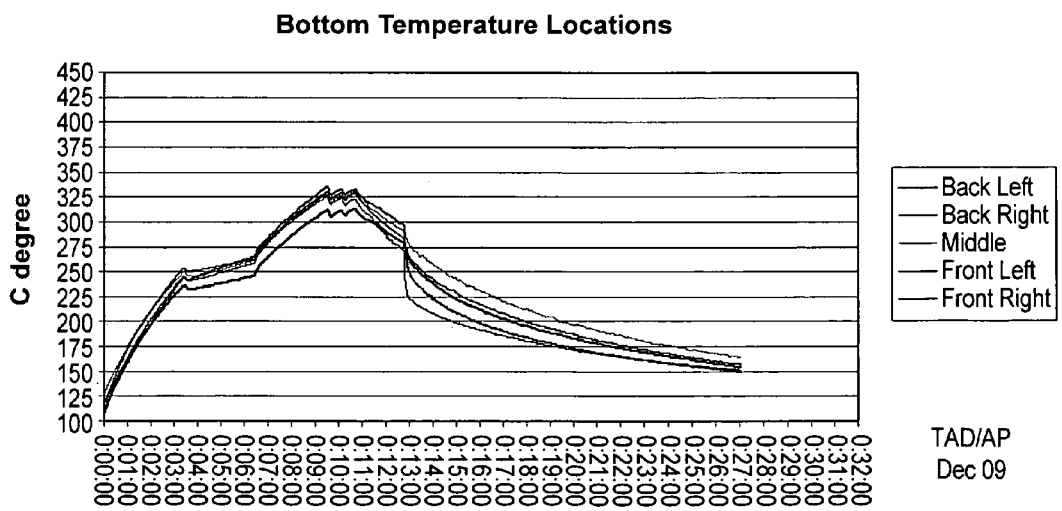

The following table identifies example heating profile steps and temperature measurements for those steps with a 40% voltage, full bulb (100% bulb usage) trial. This information is shown visually in FIGS. 16a-b, which plot temperature vs. time for top and bottom locations, respectively.

| Step ID | Step (min) | Duct Temp C. 100 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 3.6 | 0 | 40 | 22 | 40 | 37 | 23 | 32 | 0 | 0 |
| Hold | 3.0 | 0 | 15 | 8 | 23 | 30 | 7 | 21 | 0 | 0 |
| Ramp | 3.2 | 0 | 37 | 16 | 38 | 41 | 15 | 35 | 0 | 0 |
| off | 0.1 | 0 | 5 | 5 | 5 | 5 | 5 | 5 | 0 | 0 |
| on | 0.5 | 0 | 30 | 17 | 30 | 30 | 17 | 30 | 0 | 0 |
| off | 0.1 | 0 | 5 | 5 | 5 | 5 | 5 | 5 | 0 | 0 |
| on | 0.5 | 0 | 30 | 17 | 30 | 30 | 17 | 30 | 0 | 0 |
| cool | 2.0 | 0 | 10 | 0 | 5 | 5 | 0 | 5 | 0 | 100 |
| cool end | 15.0 | 0 | 10 | 0 | 5 | 15 | 0 | 5 | 50 | 100 |
| Half IR | 1.0 | 0 | 0 | 0 | 0 | 0 | 0 | 0 | 0 | 100 |

Figure 17A:
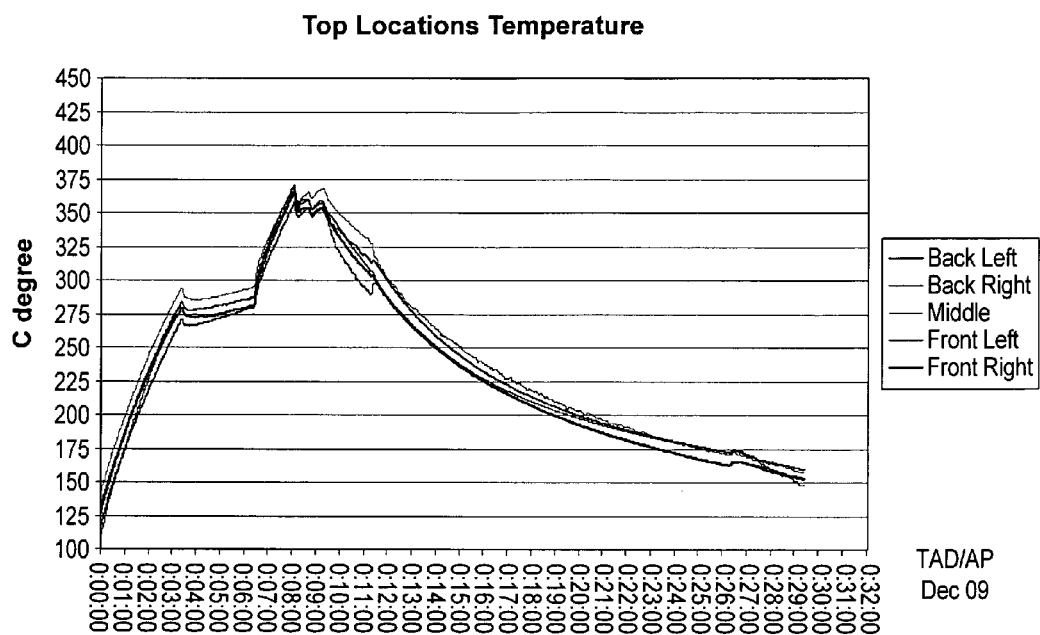
FIGS. 17a-b are graphs that plot temperature vs. time for top and bottom locations, respectively, for a 50% voltage, full bulb (100% bulb usage) trial.
Figure 17B:
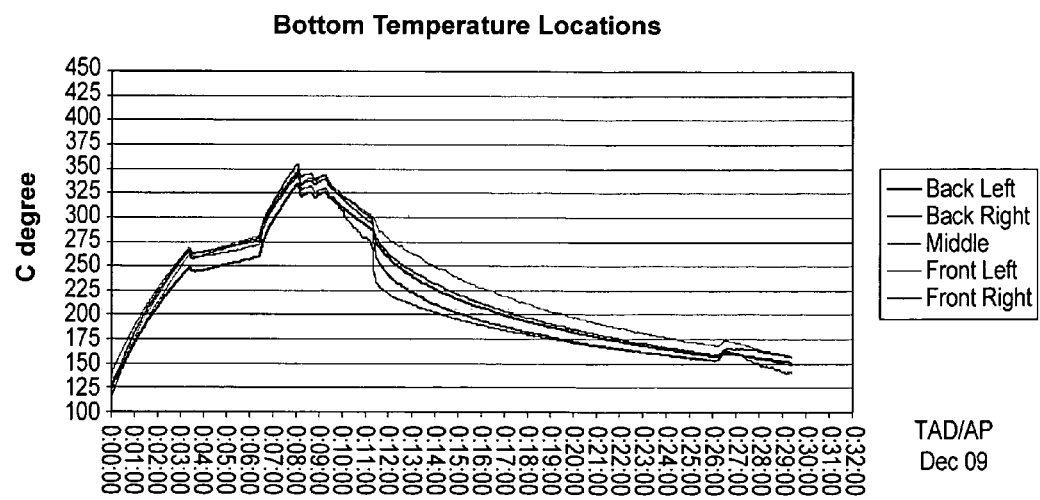

The following table identifies example heating profile steps and temperature measurements for those steps with a 50% voltage, full bulb (100% bulb usage) trial. This information is shown visually in FIGS. 17a-b, which plot temperature vs. time for top and bottom locations, respectively.

| Step ID | Step (min) | Duct Temp C. 100 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 3.6 | 0 | 40 | 22 | 40 | 37 | 23 | 32 | 0 | 0 |
| Hold | 3.0 | 0 | 15 | 8 | 23 | 30 | 7 | 21 | 0 | 0 |
| Ramp | 1.8 | 0 | 45 | 23 | 50 | 50 | 22 | 50 | 0 | 0 |
| off | 0.1 | 0 | 5 | 5 | 5 | 5 | 5 | 5 | 0 | 0 |
| on | 0.5 | 0 | 30 | 17 | 30 | 30 | 17 | 30 | 0 | 0 |
| off | 0.1 | 0 | 5 | 5 | 5 | 5 | 5 | 5 | 0 | 0 |
| on | 0.5 | 0 | 30 | 17 | 30 | 30 | 17 | 30 | 0 | 0 |
| cool | 2.0 | 0 | 10 | 0 | 5 | 5 | 0 | 5 | 0 | 100 |
| cool end | 15.0 | 0 | 10 | 0 | 5 | 15 | 0 | 5 | 50 | 100 |
| Half IR | 1.0 | 0 | 0 | 0 | 0 | 0 | 0 | 0 | 0 | 100 |

Figure 18A:
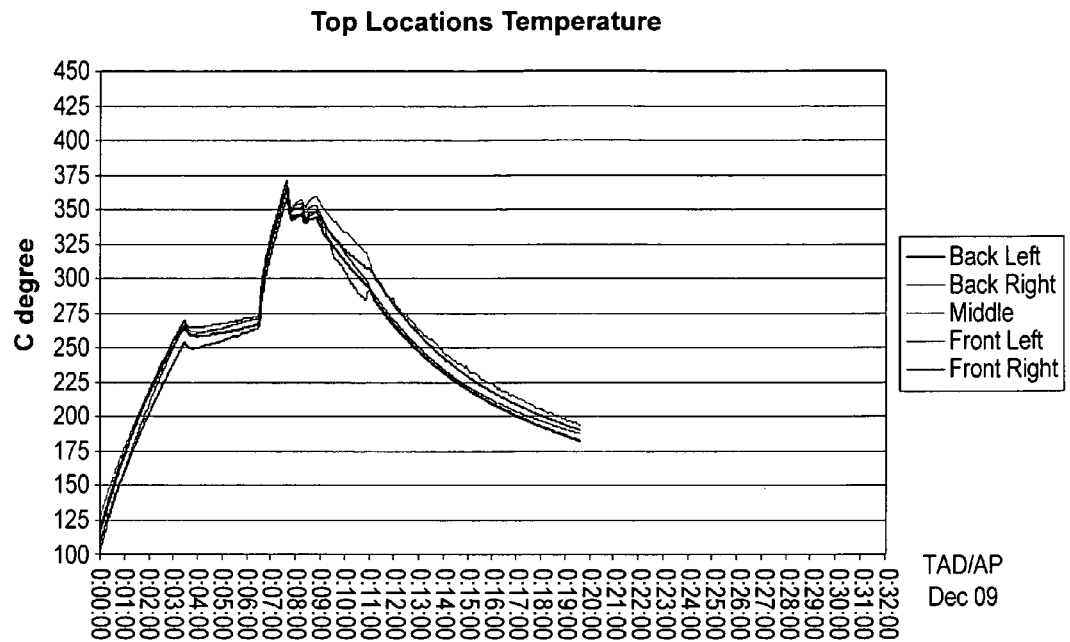
FIGS. 18a-b are graphs that plot temperature vs. time for top and bottom locations, respectively, for a 60% voltage, full bulb (100% bulb usage) trial.
Figure 18B:
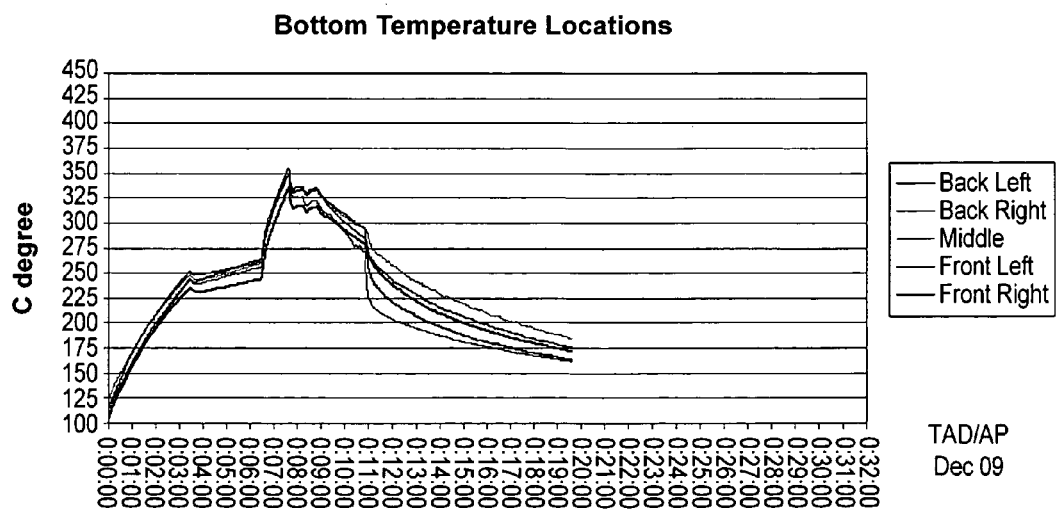

The following table identifies example heating profile steps and temperature measurements for those steps with a 60% voltage, full bulb (100% bulb usage) trial. This information is shown visually in FIGS. 18a-b, which plot temperature vs. time for top and bottom locations, respectively.

| Step (min) | Duct Temp C. 275 | Top Front | Top Middle | Top Back | Bottom Front | Bottom Middle | Bottom Back | Fan % | Damper % |
|---|---|---|---|---|---|---|---|---|---|
| | | Glass at 100 C., use 10% or 25% IR to obtain, then off 2-3 min to stabilize | | | | | | | |
| 3.6 | 0 | 40 | 22 | 40 | 37 | 23 | 32 | 0 | 0 |
| 3.0 | 0 | 15 | 8 | 23 | 30 | 7 | 21 | 0 | 0 |
| 1.2 | 0 | 60 | 40 | 60 | 60 | 40 | 60 | 0 | 0 |
| 0.1 | 0 | 5 | 5 | 5 | 5 | 5 | 5 | 0 | 0 |
| 0.5 | 0 | 30 | 17 | 30 | 30 | 17 | 30 | 0 | 0 |
| 0.1 | 0 | 5 | 5 | 5 | 5 | 5 | 5 | 0 | 0 |
| 0.5 | 0 | 30 | 17 | 30 | 30 | 17 | 30 | 0 | 0 |
| 2.0 | 0 | 10 | 0 | 5 | 5 | 0 | 5 | 0 | 100 |
| 15.0 | 0 | 10 | 0 | 5 | 15 | 0 | 5 | 50 | 100 |
| 1.0 | 0 | 0 | 0 | 0 | 0 | 0 | 0 | 0 | 100 |

Figure 19A:
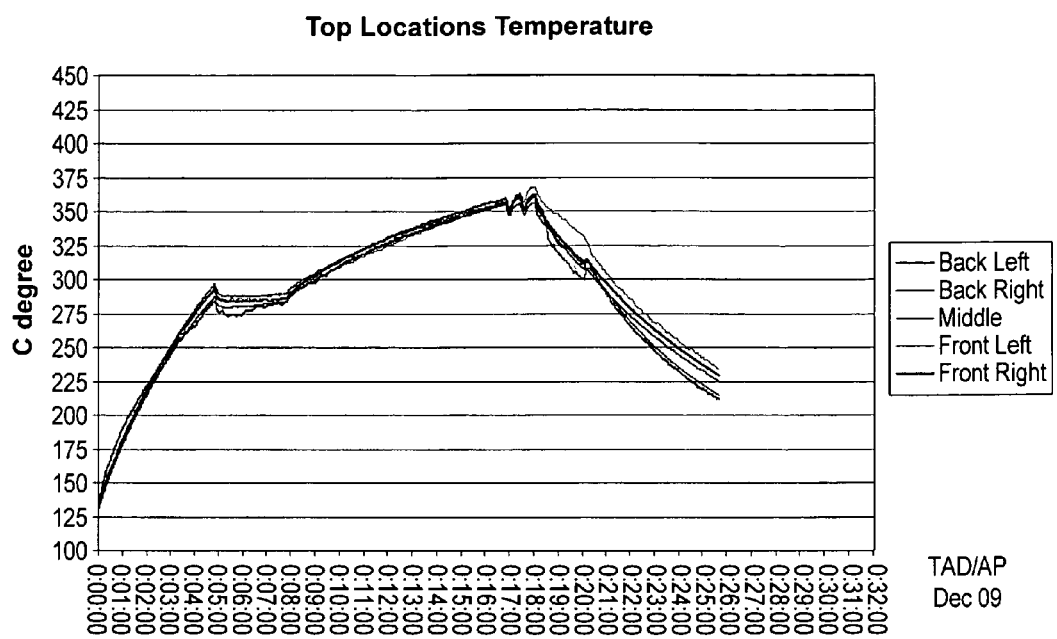
FIGS. 19a-b are graphs that plot temperature vs. time for top and bottom locations, respectively, for a 50% voltage, half bulb (50% bulb usage) trial.
Figure 19B:
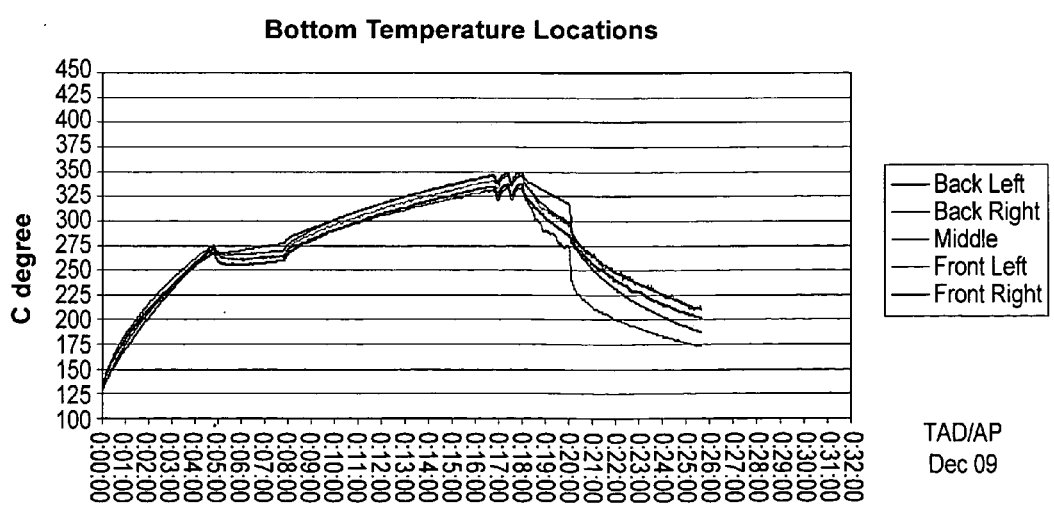

The following table identifies example heating profile steps and temperature measurements for those steps with a 50% voltage, half bulb (50% bulb usage) trial. This information is shown visually in FIGS. 19a-b, which plot temperature vs. time for top and bottom locations, respectively.

| Step ID | Step (min) | Duct Temp C. 100 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 5.0 | 0 | 50 | 35 | 60 | 59 | 30 | 50 | 0 | 0 |
| Hold | 3.0 | 0 | 32 | 15 | 43 | 40 | 9 | 33 | 0 | 0 |
| Ramp | 9.0 | 0 | 40 | 15 | 50 | 50 | 20 | 50 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| cool | 2.0 | 0 | 20 | 0 | 5 | 15 | 0 | 5 | 0 | 100 |
| cool end | 15.0 | 0 | 5 | 0 | 5 | 5 | 0 | 5 | 50 | 100 |
| Half IR | 1.0 | 0 | 0 | 0 | 0 | 0 | 0 | 0 | 0 | 100 |

Figure 20A:
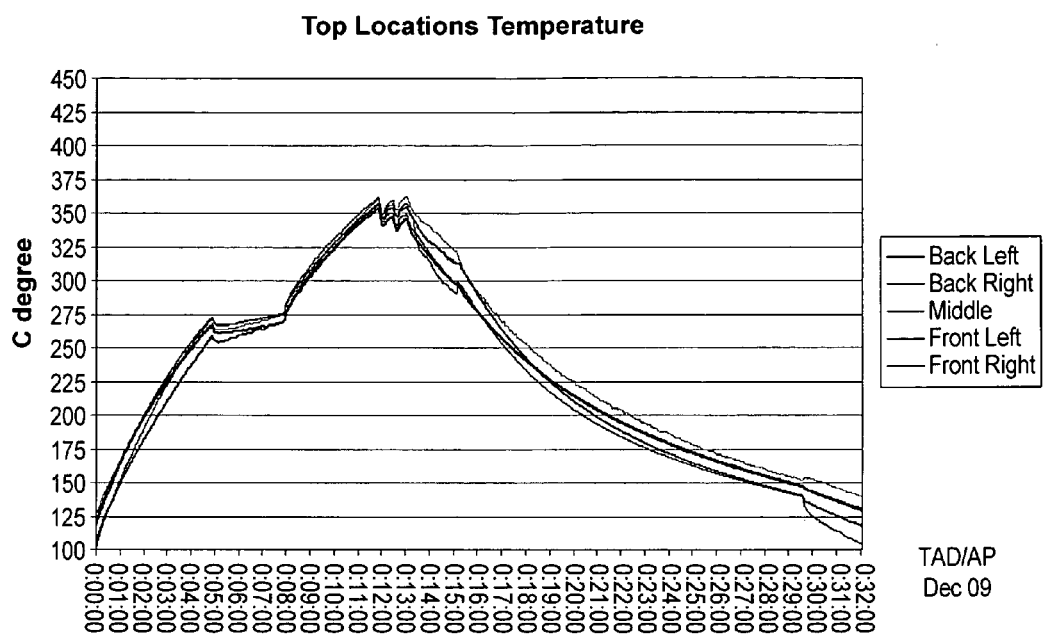
FIGS. 20a-b are graphs that plot temperature vs. time for top and bottom locations, respectively, for a 60% voltage, half bulb (50% bulb usage) trial.
Figure 20B:
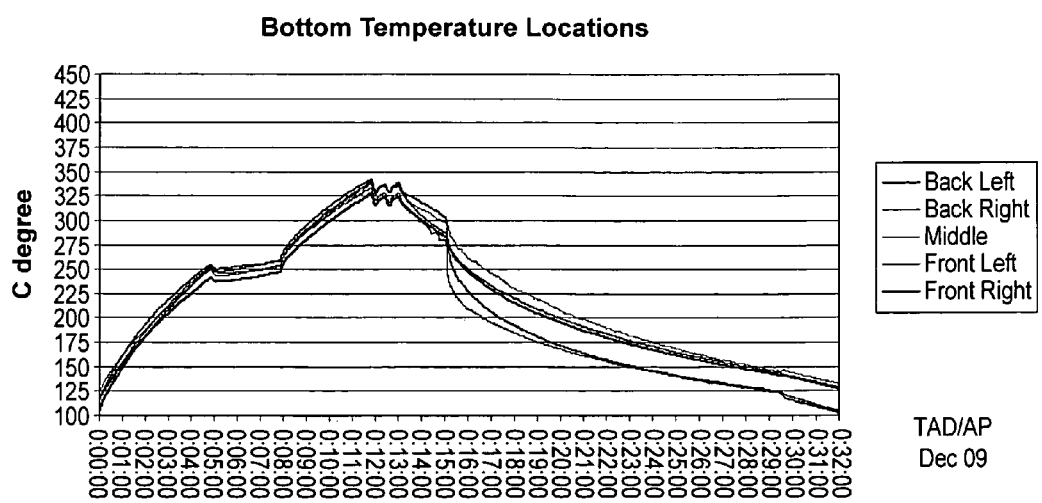

The following table identifies example heating profile steps and temperature measurements for those steps with a 60% voltage, half bulb (50% bulb usage) trial. This information is shown visually in FIGS. 20a-b, which plot temperature vs. time for top and bottom locations, respectively.

| Step ID | Step (min) | Duct Temp C. 275 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 5.0 | 0 | 50 | 35 | 60 | 59 | 30 | 50 | 0 | 0 |
| Hold | 3.0 | 0 | 32 | 15 | 43 | 40 | 9 | 33 | 0 | 0 |
| Ramp | 4.0 | 0 | 56 | 34 | 63 | 60 | 31 | 62 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| cool | 2.0 | 0 | 20 | 0 | 5 | 15 | 0 | 5 | 0 | 100 |
| cool end | 15.0 | 0 | 5 | 0 | 5 | 5 | 0 | 5 | 50 | 100 |
| Half IR | 1.0 | 0 | 0 | 0 | 0 | 0 | 0 | 0 | 0 | 100 |

Figure 21A:
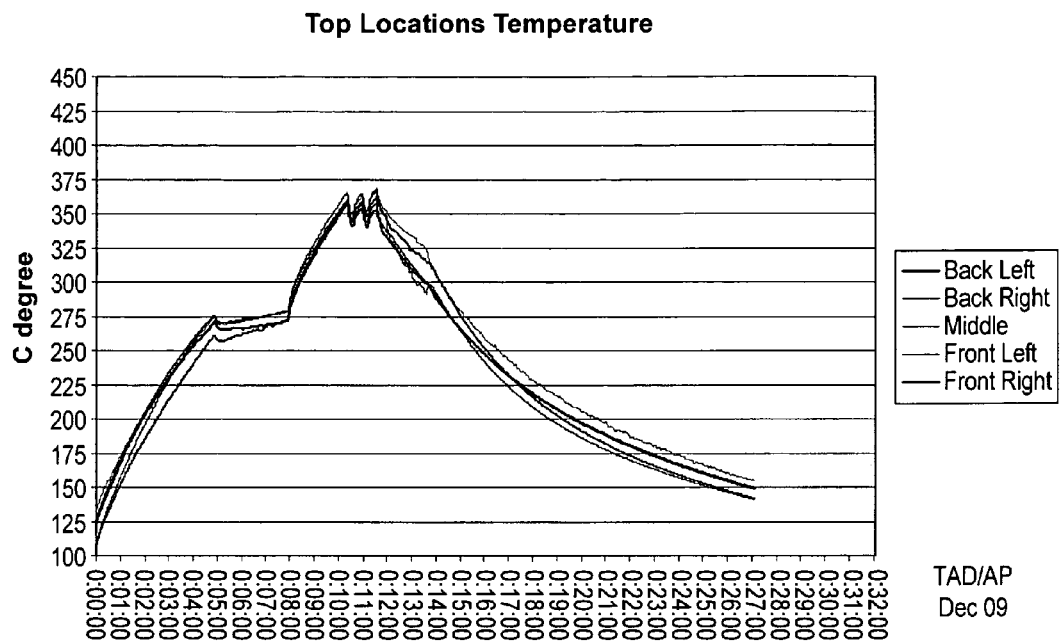
FIGS. 21a-b are graphs that plot temperature vs. time for top and bottom locations, respectively, for a 70% voltage, half bulb (50% bulb usage) trial.
Figure 21B:
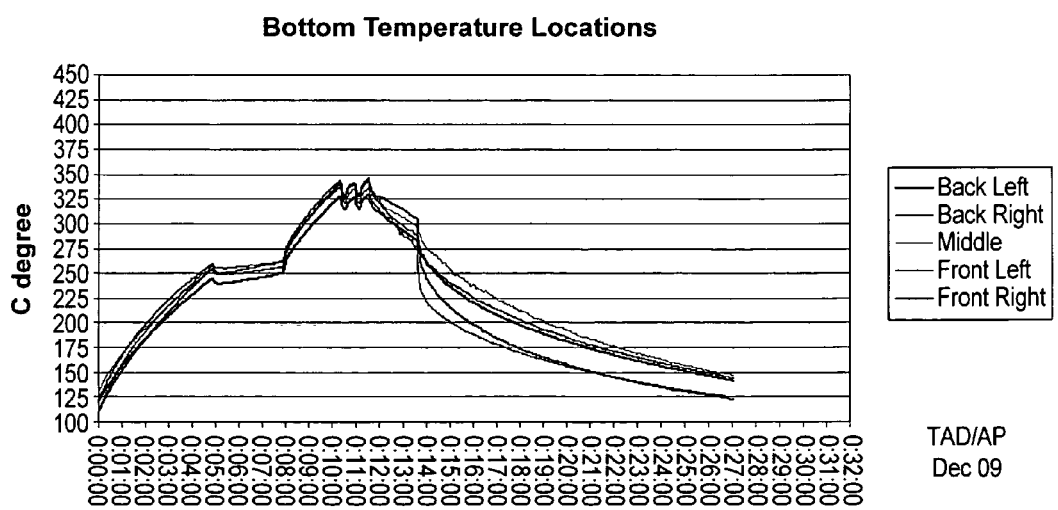

The following table identifies example heating profile steps and temperature measurements for those steps with a 70% voltage, half bulb (50% bulb usage) trial. This information is shown visually in FIGS. 21a-b, which plot temperature vs. time for top and bottom locations, respectively.

| Step ID | Step (min) | Duct Temp C. 275 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 5.0 | 0 | 50 | 35 | 60 | 59 | 30 | 50 | 0 | 0 |
| Hold | 3.0 | 0 | 32 | 15 | 43 | 40 | 9 | 33 | 0 | 0 |
| Ramp | 2.5 | 0 | 66 | 40 | 74 | 70 | 40 | 70 | 0 | 0 |
| off | 0.1 | 0 | 10 | 10 | 10 | 10 | 10 | 10 | 0 | 0 |
| on | 0.5 | 0 | 60 | 40 | 60 | 60 | 40 | 60 | 0 | 0 |
| off | 0.1 | 0 | 10 | 10 | 10 | 10 | 10 | 10 | 0 | 0 |
| on | 0.5 | 0 | 60 | 40 | 60 | 60 | 40 | 60 | 0 | 0 |
| cool | 2.0 | 0 | 20 | 0 | 5 | 15 | 0 | 5 | 0 | 100 |
| cool end | 15.0 | 0 | 5 | 0 | 5 | 5 | 0 | 5 | 50 | 100 |
| Half IR | 1.0 | 0 | 0 | 0 | 0 | 0 | 0 | 0 | 0 | 100 |

Figure 22A:
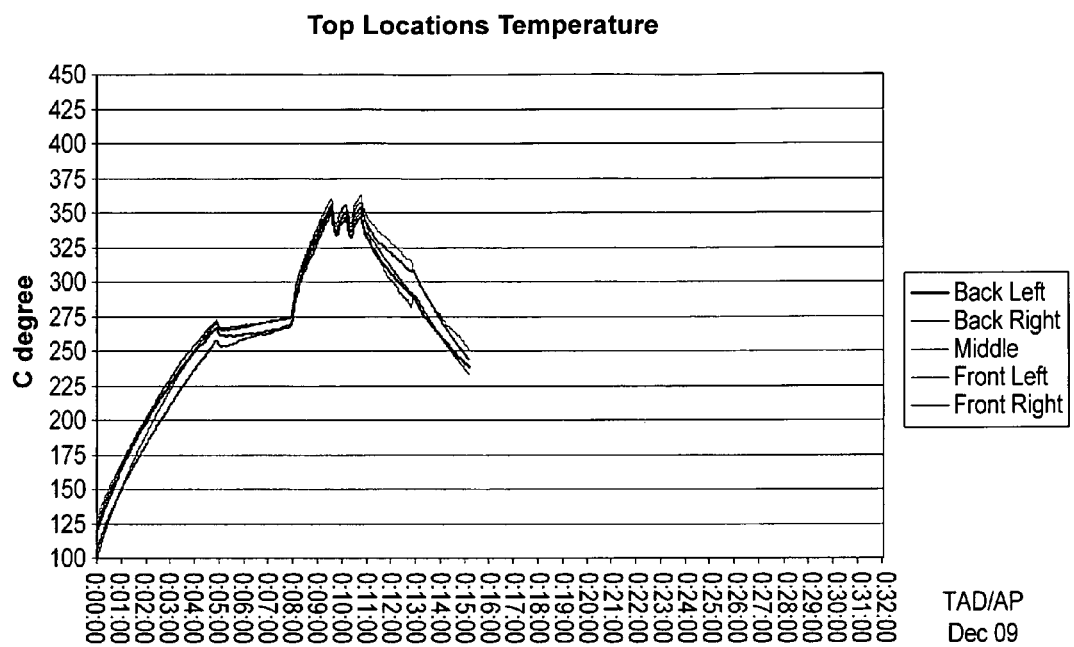
FIGS. 22a-b are graphs that plot temperature vs. time for top and bottom locations, respectively, for a 80% voltage, half bulb (50% bulb usage) trial.
Figure 22B:
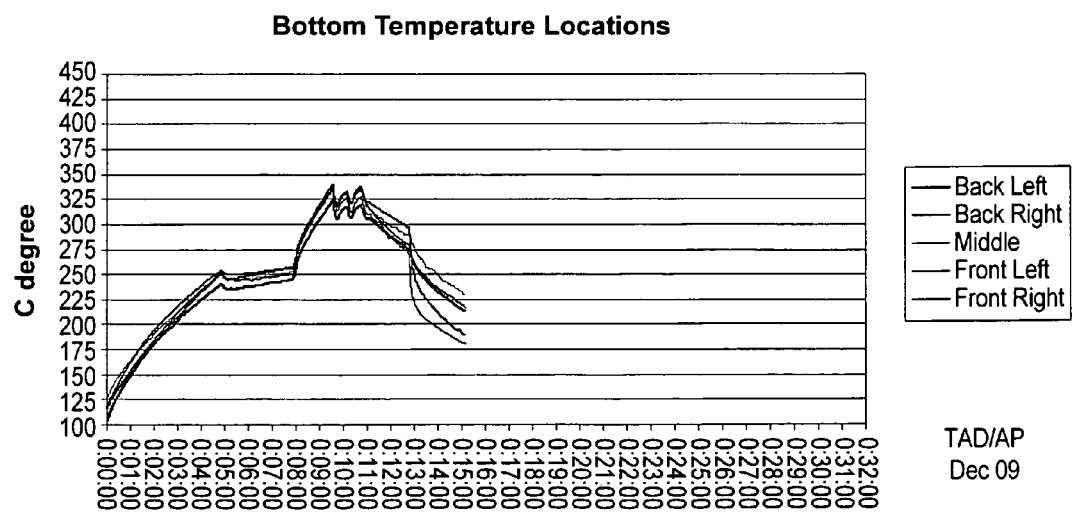

The following table identifies example heating profile steps and temperature measurements for those steps with an 80% voltage, half bulb (50% bulb usage) trial. This information is shown visually in FIGS. 22a-b, which plot temperature vs. time for top and bottom locations, respectively.

| Step ID | Step (min) | Duct Temp C. 275 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 5.0 | 0 | 50 | 35 | 60 | 59 | 30 | 50 | 0 | 0 |
| Hold | 3.0 | 0 | 32 | 15 | 43 | 40 | 9 | 33 | 0 | 0 |
| Ramp | 1.8 | 0 | 76 | 50 | 83 | 78 | 48 | 80 | 0 | 0 |
| off | 0.1 | 0 | 10 | 10 | 10 | 10 | 10 | 10 | 0 | 0 |
| on | 0.5 | 0 | 60 | 40 | 60 | 60 | 40 | 60 | 0 | 0 |
| off | 0.1 | 0 | 10 | 10 | 10 | 10 | 10 | 10 | 0 | 0 |
| on | 0.5 | 0 | 60 | 40 | 60 | 60 | 40 | 60 | 0 | 0 |
| cool | 2.0 | 0 | 20 | 0 | 5 | 15 | 0 | 5 | 0 | 100 |
| cool end | 15.0 | 0 | 5 | 0 | 5 | 5 | 0 | 5 | 50 | 100 |
| Half IR | 1.0 | 0 | 0 | 0 | 0 | 0 | 0 | 0 | 0 | 100 |

Figure 23A:
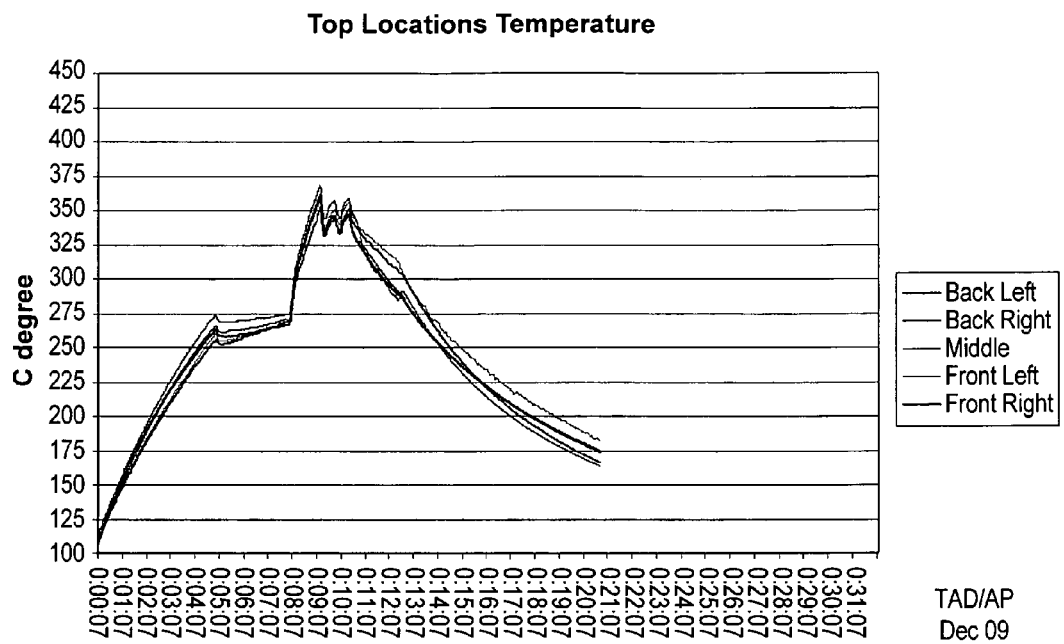
FIGS. 23a-b are graphs that plot temperature vs. time for top and bottom locations, respectively, for a 90% voltage, half bulb (50% bulb usage) trial.
Figure 23B:
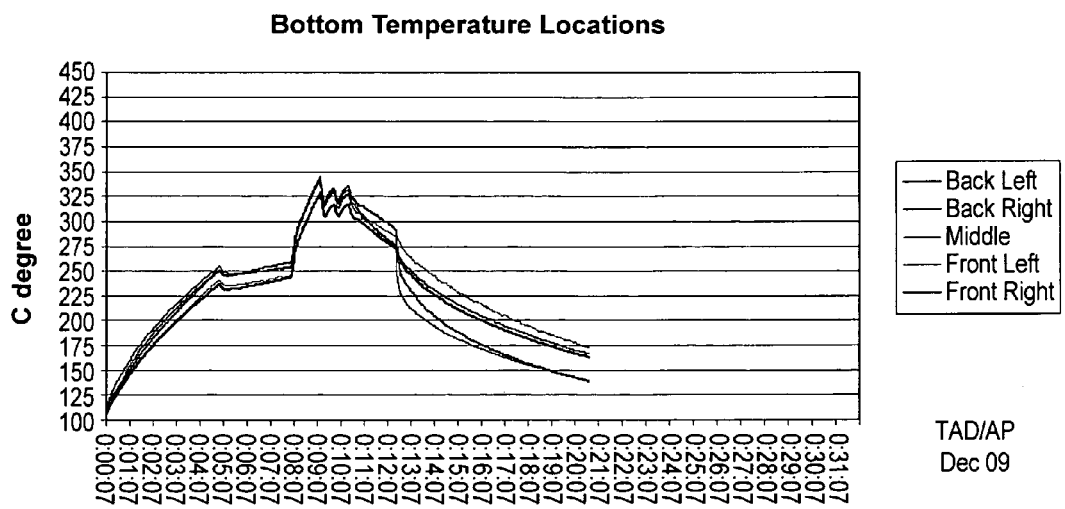

The following table identifies example heating profile steps and temperature measurements for those steps with a 90% voltage, half bulb (50% bulb usage) trial. This information is shown visually in FIGS. 23a-b, which plot temperature vs. time for top and bottom locations, respectively.

| Step ID | Step (min) | Duct Temp C. 100 | Top Front | Top Middle | Top Back | Bottom Front | Bottom Middle | Bottom Back | Fan % | Damper % |
|---|---|---|---|---|---|---|---|---|---|---|
| | | | Glass at 100 C., use 10% or 25% IR to obtain, then off 2-3 min to stabilize | | | | | | | |
| Ramp | 5.0 | 0 | 50 | 35 | 60 | 59 | 30 | 50 | 0 | 0 |
| Hold | 3.0 | 0 | 32 | 15 | 43 | 40 | 9 | 33 | 0 | 0 |
| Ramp | 1.4 | 0 | 85 | 60 | 96 | 90 | 60 | 90 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| off | 0.1 | 0 | 10 | 10 | 10 | 10 | 10 | 10 | 0 | 0 |
| on | 0.5 | 0 | 50 | 30 | 50 | 50 | 30 | 50 | 0 | 0 |
| cool | 2.0 | 0 | 20 | 0 | 5 | 15 | 0 | 5 | 0 | 100 |
| cool end | 15.0 | 0 | 5 | 0 | 5 | 5 | 0 | 5 | 50 | 100 |
| Half IR | 1.0 | 0 | 0 | 0 | 0 | 0 | 0 | 0 | 0 | 100 |

It will be appreciated that the example profiles described above involve no cycling on-and-off of the bulbs, e.g., based on position of the VIG subassembly relative to the bulbs. Rather, in certain example embodiments, the bulbs may be controlled solely based on temperature requirements.

Certain example embodiments have been described as relating to half bulb density (or 50% bulb usage) and full bulb density (or 100% bulb usage). It will be appreciated that this refers to the approximate number of bulbs in an array of bulbs that are turned on or off. That is, half bulb density (or 50% bulb usage) refers to approximately one-half of the bulbs being on with the rest being off, etc. In such a scenario, every other bulb may be on, etc., although other arrangements are possible in different implementations. Bulbs suitable for use in certain example implementations include those commercially provided by Castle Solar.

It will be appreciated that the example embodiments described herein may be used in connection with a variety of different VIG assembly and/or other units or components. For example, the substrates may be glass substrates, heat strengthened substrates, tempered substrates, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulated glass (VIG) unit comprising an edge seal, the method comprising:
   inserting a subassembly for a VIG unit including first and second glass substrates with seal material comprising frit therebetween into an apparatus including:
     a plurality of infrared (IR) heating elements that comprise bulbs controllable to emit IR radiation at a peak wavelength in the near infrared (NIR) and/or short wave infrared (SWIR) band(s), the plurality of IR heating elements being spaced apart from one another so as to have a 2-6" center-to-center distance and being vertically positioned 2-10" above an upper surface and/or below a lower surface of the VIG subassembly,
   heating frit of the seal material provided proximate the periphery of the subassembly via the plurality of IR heating elements in forming the edge seal, the amount of voltage being supplied to the plurality of IR heating elements being adjustable to vary the peak wavelength produced by the plurality of IR heating elements so as to preferentially heat the frit compared to glass substrates of the VIG subassembly, and
   during said heating when approximately half of the bulbs are in an "on" state for heating the seal material, approximately the other half of the bulbs are in an "off"

state so that approximately half bulb density is employed during said heating.

2. The method of claim 1, wherein the peak wavelength is between 1300-1700 nm.

3. The method of claim 1, wherein the peak wavelength is selected so that at least about three times as much energy is absorbable by the frit as compared to glass substrates of the subassembly.

4. The method of claim 1, wherein the IR heating elements are oriented at approximately 90 degree angles relative to a surface on which they are mounted.

5. The method of claim 1, wherein the IR heating elements are oriented at approximately 45 degree angles relative to a surface on which they are mounted.

6. The method of claim 1, maintaining a stable heating environment in which the temperature across the subassembly varies by no more than ±5degrees C.

7. The method of claim 1, further comprising maintaining an interior of the apparatus at a first elevated temperature via the IR heat elements and without the use of any further heating elements, the first elevated temperature being lower than a temperature needed to form the edge seal.

8. The method of claim 7, further comprising adjusting the output of the TR heating elements via voltage changes to move from the first elevated temperature to the temperature needed to form the edge seal once the subassembly has been inserted into the apparatus.

9. The method of claim 1, wherein glass substrates of the subassembly do not reach a temperature of 325 degrees C. for longer than 1 minute during the heating of the frit material.

10. A method of making a vacuum insulated glass (VIG) unit comprising an edge seal, the method comprising:
  providing a subassembly for a VIG unit in an apparatus including at least one heating area, the subassembly for the VIG unit including first and second tempered glass substrates with spacers, a gap and seal material comprising frit located at least partially between the glass substrates, wherein a periphery of the gap is defined by the seal material;
  the apparatus including a plurality of infrared (IR) heating elements that comprise bulbs which are controllable to emit IR radiation at a peak wavelength in the near infrared (NIR) and/or short wave infrared (SWIR) band(s),
  heating frit of the seal material provided proximate the periphery of the subassembly via the plurality of IR heating elements in forming the edge seal so as to preferentially heat the frit compared to glass substrates of the VIG subassembly, and
  during said heating when approximately half of the bulbs in the heating area are in an "on" state for heating the seal material, approximately the other half of the bulbs in the heating area are in an "off" state so that approximately half bulb density is employed during said heating.

11. The method of claim 10, wherein the peak wavelength is between 1300-1700 nm.

12. The method of claim 10, wherein the peak wavelength is selected so that at least about three times as much energy is absorbable by the frit as compared to glass substrates of the subassembly.

13. The method of claim 10, further comprising adjusting voltage provided to the bulbs in order to adjust the peak wavelength(s).

14. The method of claim 10, further comprising evacuating the gap to a pressure less than atmospheric pressure after said heating.

15. A method of making a vacuum insulated glass (VIG) unit comprising an edge seal, the method comprising:
  providing a subassembly for a VIG unit in an apparatus including at least one heating area, the subassembly for the VIG unit including first and second glass substrates with spacers, a gap and seal material comprising frit located at least partially between the glass substrates, wherein a periphery of the gap is defined by the seal material;
  the apparatus including a plurality of infrared (IR) heating elements which are controllable to emit IR radiation at a peak wavelength in the near infrared (NIR) and/or short wave infrared (SWIR) band(s),
  heating frit of the seal material provided proximate the periphery of the subassembly via the plurality of IR heating elements in forming the edge seal so as to preferentially heat the frit compared to glass substrates of the VIG subassembly,
  during said heating when a first portion of the IR heating elements in the heating area are in an "on" state for heating the seal material approximately the remainder of the IR heating elements in the heating area are in an "off" state so that only partial IR heating element density is employed during said heating; and
  wherein glass substrates of the subassembly do not reach a temperature of 325 degrees C. for longer than 1 minute during the heating of the frit material.

* * * * *